United States Patent
Gupta et al.

(10) Patent No.: US 12,543,176 B2
(45) Date of Patent: Feb. 3, 2026

(54) INTERFERENCE MITIGATION FOR ENVELOPE DETECTION IN AMBIENT INTERNET-OF-THINGS COMMUNICATIONS

(71) Applicant: QUALCOMM Incorporated, San Diego, CA (US)

(72) Inventors: Piyush Gupta, Bridgewater, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/334,127

(22) Filed: Jun. 13, 2023

(65) Prior Publication Data

US 2024/0422773 A1    Dec. 19, 2024

(51) Int. Cl.
*H04W 72/1268* (2023.01)
*H04W 72/20* (2023.01)
*H04W 4/80* (2018.01)

(52) U.S. Cl.
CPC ....... *H04W 72/1268* (2013.01); *H04W 72/20* (2023.01)

(58) Field of Classification Search
CPC .. H04L 5/0094; H04W 4/80; H04W 72/1268; H04W 72/20
USPC .......................... 370/252, 329, 430
See application file for complete search history.

(56) References Cited

U.S. PATENT DOCUMENTS 11,171,678 B2 *  11/2021  Hoang .................... H04B 1/04
12,231,272 B2     2/2025   Patchava et al.
12,362,973 B2 *   7/2025   Baldemair ............... H04L 5/26
2020/0304160 A1   9/2020   Hoang et al.
2023/0107204 A1 * 4/2023   Shao ..................... H04W 72/04
                                                          370/329

(Continued)

FOREIGN PATENT DOCUMENTS

WO    WO-2023000209 A1    1/2023

OTHER PUBLICATIONS

International Search Report and Written Opinion—PCT/US2024/031152—ISA/EPO—Dec. 16, 2024.

(Continued)

*Primary Examiner* — John Pezzlo
(74) *Attorney, Agent, or Firm* — QUALCOMM Incorporated

(57) ABSTRACT

Methods, systems, and devices for wireless communications are described. A wireless communication device may receive, via a first radio frequency spectrum band, a control message that includes an uplink grant for sending one or more backscattered uplink messages via a second radio frequency spectrum band that is higher than in frequency than the first radio frequency spectrum band and separated from the first radio frequency spectrum band by at least a threshold frequency gap. The wireless communication device may then receive a continuous waveform via the second radio frequency spectrum band, and modulate the continuous waveform with uplink data of the one or more backscattered uplink messages. The wireless device may then send, via the second radio frequency spectrum band, a backscattered signal of the continuous waveform based on modulating the continuous waveform with the uplink data.

30 Claims, 16 Drawing Sheets

(56) References Cited

U.S. PATENT DOCUMENTS

| | | | |
|---|---|---|---|
| 2023/0239920 A1* | 7/2023 | Xue | H04W 28/26 |
| | | | 370/329 |
| 2023/0296722 A1* | 9/2023 | Shrestha | G01S 5/0269 |
| | | | 455/456.1 |
| 2024/0322976 A1* | 9/2024 | Lu | H04L 27/2602 |
| 2024/0380536 A1 | 11/2024 | Patchava et al. | |

OTHER PUBLICATIONS

Rostami M., et al., "MIXIQ Re-Thinking Ultra-Low Power Receiver Design for Next-Generation On-Body Applications", Proceedings of the 27th Annual International Conference on Mobile Computing and Networking, ACM, New York, NY, USA, Oct. 25, 2021, XP058751460, pp. 364-377, section 1, figure 2.

Jeong S-W., et al., "Frequency-Tunable Absorptive Bandpass Filter Using Substrate-Integrated Waveguide Structure", IEEE Transactions on Microwave Theory and Techniques, vol. 69, No. 12, Dec. 2021, pp. 5351-5359.

Psychogiou D., et al., "RF-Design of Narrowband Absorptive Bandstop Filters for UHF Applications", IEEE 16th Annual Wireless and Microwave Technology Conference (WAMICON), Cocoa Beach, FL, USA, 2015, 4 pages.

* cited by examiner

INTERFERENCE MITIGATION FOR ENVELOPE DETECTION IN AMBIENT INTERNET-OF-THINGS COMMUNICATIONS

FIELD OF TECHNOLOGY

The following relates to wireless communications, including interference mitigation for envelope detection in ambient internet-of-things (IoT) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interference mitigation for envelope detection in ambient internet-of-things (IoT) communications. To support efficient envelope detection techniques and to reduce the effects of both co-channel transmission interference and interference from other ambient IoT transmissions, a wireless communications system may employ a dual-band configuration. For example, downlink data transmission may occur on or performed using a first radio frequency spectrum band (e.g., a 700 megahertz (MHz) band), while continuous wave transmission used for backscattering and other uplink communications may occur on or performed using a second radio frequency spectrum band (e.g., a 4 gigahertz (GHz) band). In such dual-band configurations, the uplink and downlink bands may be separated in frequency by a threshold frequency gap. A wireless communication device such as an ambient IoT device or a passive tag may receive control information on the first radio frequency spectrum band (e.g., a lower band) that includes and uplink grant for backscattering uplink communications. The wireless communication device may then receive a continuous waveform on the second radio frequency spectrum band (e.g., a higher band) and may modulate and send uplink data via the continuous wave.

A method for wireless communications at a first wireless communication device is described. The method may include receiving, via a first radio frequency spectrum band, a control message including an uplink grant for the first wireless communication device to send, via a second radio frequency spectrum band, one or more backscattered uplink messages, receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, modulating the continuous waveform with uplink data of the one or more backscattered uplink messages based on receiving the continuous waveform, and sending, via the second radio frequency spectrum band, a backscattered signal of the continuous waveform based on modulating the continuous waveform with the uplink data, where the backscattered signal includes the one or more backscattered uplink messages.

An apparatus for wireless communications at a first wireless communication device is described. The apparatus may include at least one processor, at least one memory coupled with the at least one processor, and instructions stored in the at least one memory. The instructions may be executable by the at least one processor to cause the apparatus to receive, via a first radio frequency spectrum band, a control message including an uplink grant for the first wireless communication device to send, via a second radio frequency spectrum band, one or more backscattered uplink messages, receive, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, modulate the continuous waveform with uplink data of the one or more backscattered uplink messages based on receiving the continuous waveform, and send, via the second radio frequency spectrum band, a backscattered signal of the continuous waveform based on modulating the continuous waveform with the uplink data, where the backscattered signal includes the one or more backscattered uplink messages.

Another apparatus for wireless communications at a first wireless communication device is described. The apparatus may include means for receiving, via a first radio frequency spectrum band, a control message including an uplink grant for the first wireless communication device to send, via a second radio frequency spectrum band, one or more backscattered uplink messages, means for receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, means for modulating the continuous waveform with uplink data of the one or more backscattered uplink messages based on receiving the continuous waveform, and means for sending, via the second radio frequency spectrum band, a backscattered signal of the continuous waveform based on modulating the continuous waveform with the uplink data, where the backscattered signal includes the one or more backscattered uplink messages.

A non-transitory computer-readable medium storing code for wireless communications at a first wireless communication device is described. The code may include instructions executable by a processor to receive, via a first radio frequency spectrum band, a control message including an uplink grant for the first wireless communication device to send, via a second radio frequency spectrum band, one or more backscattered uplink messages, receive, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, modulate the continuous waveform with uplink data of the one or more backscattered uplink messages based on receiving the continuous waveform, and send, via the second radio frequency spectrum band, a backscattered signal of the continuous waveform based on modulating the continuous waveform with the uplink data, where the backscattered signal includes the one or more backscattered uplink messages.

Some examples of the method, apparatuses, and non-transitory computer-readable medium described herein may further include operations, features, means, or instructions for receiving one or more downlink signals via the first radio frequency spectrum band, the one or more downlink signals including at least a set of co-source transmissions and performing one or more passive bandpass filtering operations to filter the set of co-source transmissions from the one or more downlink signals.

Some examples of the method, apparatuses, and non-transitory computer-readable medium described herein may further include operations, features, means, or instructions for performing an envelope detection operation on the one or more downlink signals after performing the one or more passive bandpass filtering operations to filter the set of co-source transmissions from the one or more downlink signals.

Some examples of the method, apparatuses, and non-transitory computer-readable medium described herein may further include operations, features, means, or instructions for receiving one or more downlink signals via the first radio frequency spectrum band, the one or more downlink signals including both a first set of downlink signals from the second wireless communication device and a second set of interfering downlink signals from a third wireless device and performing a dual-tone decoding operation to separate the first set of downlink signals from the second set of interfering downlink signals.

Some examples of the method, apparatuses, and non-transitory computer-readable medium described herein may further include operations, features, means, or instructions for performing an envelope detection operation on the one or more downlink signals after performing the dual-tone decoding operation to separate the first set of downlink signals from the second set of interfering downlink signals.

Some examples of the method, apparatuses, and non-transitory computer-readable medium described herein may further include operations, features, means, or instructions for receiving, as part of a wireless power transfer procedure, wireless power transfer signaling from the second wireless communication device via the first radio frequency spectrum band, the second radio frequency spectrum band, or both.

Some examples of the method, apparatuses, and non-transitory computer-readable medium described herein may further include operations, features, means, or instructions for sending, concurrently with receiving the wireless power transfer signaling via the first radio frequency spectrum band, the backscattered signal of the continuous waveform via the second radio frequency spectrum band.

Some examples of the method, apparatuses, and non-transitory computer-readable medium described herein may further include operations, features, means, or instructions for receiving, concurrently with receiving the wireless power transfer signaling via the first radio frequency spectrum band, one or more downlink messages via the first radio frequency spectrum band.

In some examples of the method, apparatuses, and non-transitory computer-readable medium described herein, the threshold frequency gap includes a frequency gap greater than 1 gigahertz (GHz).

In some examples of the method, apparatuses, and non-transitory computer-readable medium described herein, the first radio frequency spectrum band includes a first set of radio frequencies associated with narrow-band IoT communications and the second radio frequency spectrum band includes a second set of radio frequencies associated with industrial IoT communications.

In some examples of the method, apparatuses, and non-transitory computer-readable medium described herein, the first radio frequency spectrum band and the second radio frequency spectrum band include a set of one or more paired radio frequency spectrum bands associated with ambient IoT communications.

In some examples of the method, apparatuses, and non-transitory computer-readable medium described herein, the second radio frequency spectrum band may be associated with higher traffic rates and higher user density relative to the first radio frequency spectrum band.

In some examples of the method, apparatuses, and non-transitory computer-readable medium described herein, the first wireless communication device includes an ambient IoT device, a low-power tag device, a UE, or any combination thereof.

In some examples of the method, apparatuses, and non-transitory computer-readable medium described herein, the second wireless communication device includes an ambient IoT device, a reader device, a network entity, a UE, or any combination thereof.

A method for wireless communications at a first wireless communication device is described. The method may include transmitting, via a first radio frequency spectrum band, a control message including an uplink grant for a second wireless communication device to send, via a second radio frequency spectrum band, one or more backscattered uplink messages, transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, transmitting the continuous waveform via the second radio frequency spectrum band, and receiving, via the second radio frequency spectrum band, a backscattered signal of the continuous waveform based on transmitting the continuous waveform, where the backscattered signal includes the one or more backscattered uplink messages.

An apparatus for wireless communications at a first wireless communication device is described. The apparatus may include at least one processor, at least one memory coupled with the at least one processor, and instructions stored in the at least one memory. The instructions may be executable by the at least one processor to cause the apparatus to transmit, via a first radio frequency spectrum band, a control message including an uplink grant for a second wireless communication device to send, via a second radio frequency spectrum band, one or more backscattered uplink messages, transmit, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, transmit the continuous waveform via the second radio frequency spectrum band, and receive, via the second radio frequency spectrum band, a backscattered signal of the continuous waveform based on transmitting the continuous waveform, where the backscattered signal includes the one or more backscattered uplink messages.

Another apparatus for wireless communications at a first wireless communication device is described. The apparatus may include means for transmitting, via a first radio frequency spectrum band, a control message including an uplink grant for a second wireless communication device to send, via a second radio frequency spectrum band, one or more backscattered uplink messages, means for transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, means for transmitting the continuous waveform via the second radio frequency spectrum band, and means for receiving, via the second radio frequency spectrum band, a backscattered signal of the continuous waveform based on transmitting the continuous waveform, where the backscattered signal includes the one or more backscattered uplink messages.

A non-transitory computer-readable medium storing code for wireless communications at a first wireless communication device is described. The code may include instructions executable by a processor to transmit, via a first radio frequency spectrum band, a control message including an uplink grant for a second wireless communication device to send, via a second radio frequency spectrum band, one or more backscattered uplink messages, transmit, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap, transmit the continuous waveform via the second radio frequency spectrum band, and receive, via the second radio frequency spectrum band, a backscattered signal of the continuous waveform based on transmitting the continuous waveform, where the backscattered signal includes the one or more backscattered uplink messages.

Some examples of the method, apparatuses, and non-transitory computer-readable medium described herein may further include operations, features, means, or instructions for transmitting one or more downlink signals via the first radio frequency spectrum band, the one or more downlink signals including at least a set of co-source transmissions for the second wireless communication device and a third wireless communication device.

Some examples of the method, apparatuses, and non-transitory computer-readable medium described herein may further include operations, features, means, or instructions for transmitting one or more downlink signals via the first radio frequency spectrum band, the one or more downlink signals including both a first set of downlink signals from the second wireless communication device transmitted with a second set of interfering downlink signals from a third wireless device.

Some examples of the method, apparatuses, and non-transitory computer-readable medium described herein may further include operations, features, means, or instructions for transmitting, as part of a wireless power transfer procedure, wireless power transfer signaling to the second wireless communication device via the first radio frequency spectrum band, the second radio frequency spectrum band, or both.

Some examples of the method, apparatuses, and non-transitory computer-readable medium described herein may further include operations, features, means, or instructions for receiving, concurrently with transmitting the wireless power transfer signaling via the first radio frequency spectrum band, the backscattered signal of the continuous waveform via the second radio frequency spectrum band.

Some examples of the method, apparatuses, and non-transitory computer-readable medium described herein may further include operations, features, means, or instructions for transmitting, concurrently with transmitting the wireless power transfer signaling via the first radio frequency spectrum band, one or more downlink messages via the first radio frequency spectrum band.

In some examples of the method, apparatuses, and non-transitory computer-readable medium described herein, the threshold frequency gap includes a frequency gap of greater than 1 GHz.

In some examples of the method, apparatuses, and non-transitory computer-readable medium described herein, the first radio frequency spectrum band includes a first set of radio frequencies associated with narrow-band IoT communications and the second radio frequency spectrum band includes a second set of radio frequencies associated with industrial IoT communications.

In some examples of the method, apparatuses, and non-transitory computer-readable medium described herein, the first radio frequency spectrum band and the second radio frequency spectrum band include a set of one or more paired radio frequency spectrum bands associated with ambient IoT communications.

In some examples of the method, apparatuses, and non-transitory computer-readable medium described herein, the second radio frequency spectrum band may be associated with higher traffic rates and higher user density relative to the first radio frequency spectrum band.

In some examples of the method, apparatuses, and non-transitory computer-readable medium described herein, the first wireless communication device includes an ambient IoT device, a reader device, a network entity, a UE, or any combination thereof.

In some examples of the method, apparatuses, and non-transitory computer-readable medium described herein, the second wireless communication device includes an ambient IoT device, a low-power tag device, a UE, or any combination thereof.

DETAILED DESCRIPTION

Figure 1:
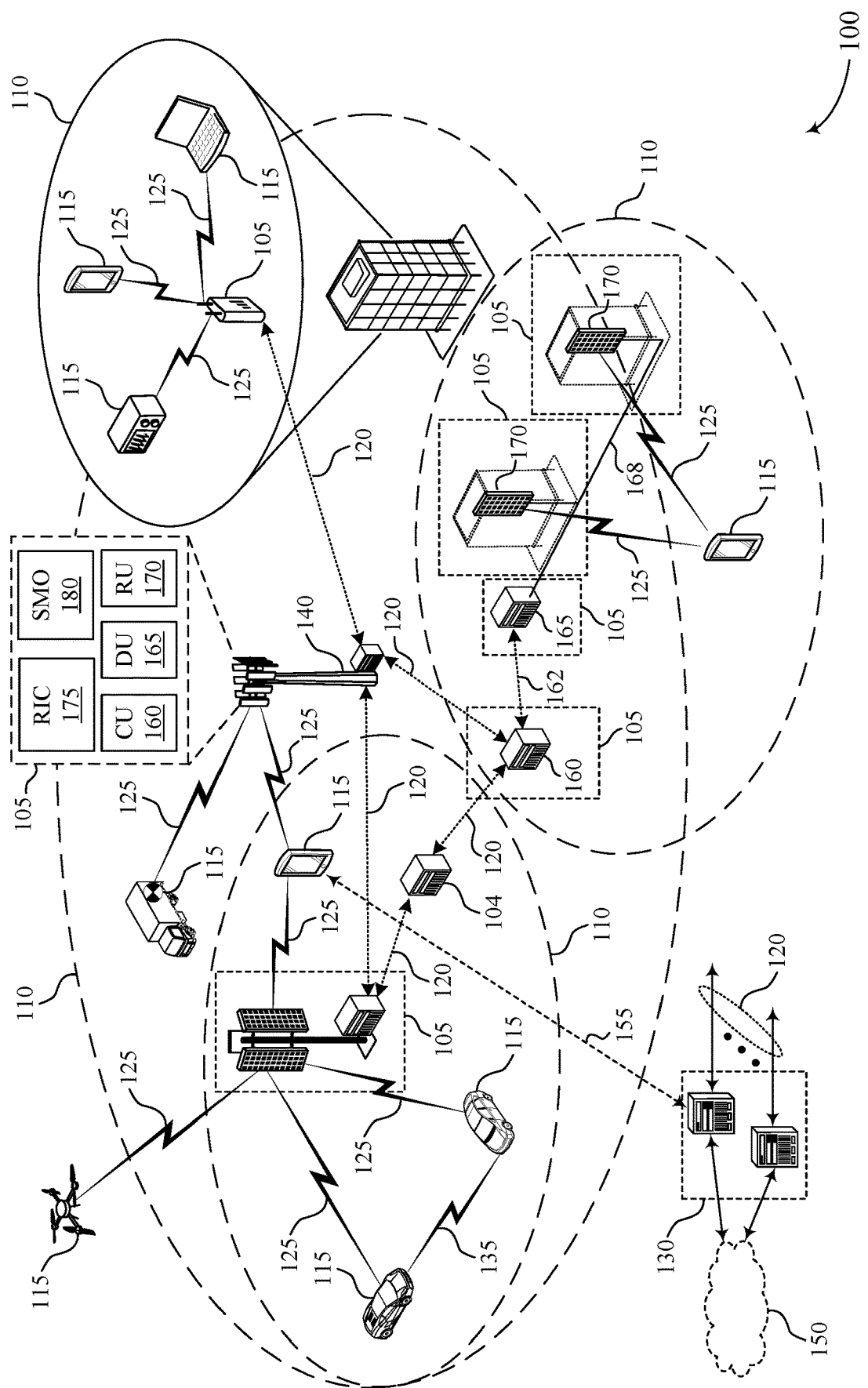
FIGS. 1 and 2 show examples of wireless communications systems that support interference mitigation for envelope detection in ambient internet-of-things (IoT) communications in accordance with one or more aspects of the present disclosure.

Some wireless communications devices may implement envelope tracking and envelope decoding techniques to detect certain waveform types used to carry data, such as amplitude shift keying (ASK) waveforms, phase shift keying (PSK) waveforms, or both. Envelope detection techniques may be used by low-power devices such as passive tags, user equipment (UE), or other devices such as ambient internet-of-things (IoT) devices, to detect propagating waveforms and recover encoded data while supporting the low-complexity, low cost, and low energy targets associated with ambient IoT systems. Envelope detection techniques may also enable relatively simpler device designs (e.g., low-tier devices), including some low-cost designs that operate without active radio frequency (RF) components, down conversion, and without carrier frequency offset or frequency synchronization at the receiver.

In some implementations, however, envelope tracking and decoding may suffer from co-channel transmissions such as interference from neighboring network entities or from concurrent transmissions (e.g., control transmissions, data transmissions) from a same network entity to other nearby receiving devices. In such implementations, an ambient IoT device may detect an envelope that is a cumulative signal over all transmissions it receives, including the desired signal transmission, other co-source transmissions, transmissions from other neighboring network entities, among other transmissions. The detected envelope, therefore, may be affected by interference by several sources which may disrupt the envelope tracking operations of the receiving device, and degrade overall communication quality.

To address both co-channel transmission interference and interference from other ambient IoT transmissions, a wireless communications system may support a dual-band configuration to mitigate the co-channel interference that arises from envelope detection in ambient IoT deployments. For example, downlink data transmission (e.g., control information sent from a network entity or reader device to an ambient IoT device or UE) may occur on a lower band (e.g., a 700 megahertz (MHz) band), while continuous wave transmission (transmitted from the network entity or reader device to use for backscattering by the ambient IoT device or UE) and other uplink transmissions (from the ambient IoT device or UE to the reader device or network entity) occurs on a higher band (e.g., a 4 gigahertz (GHz) band). In such dual-band configurations, the uplink and downlink bands may be significantly separated in frequency which may allow the ambient IoT devices to more effectively perform passive filtering techniques and dual-tone filtering on the downlink band to reduce co-source transmission interference, while the higher band (with larger bandwidth) can be used to support device-originated traffic from a relatively large number of ambient IoT devices or tags present in a wireless communications system.

In some examples, the ambient IoT device may receive downlink information using different oscillators, antennas, or a combination thereof, than those used for backscattering in the higher band. Additionally or alternatively, the reader device or the network entity may be capable of transmitting downlink information in the lower band while concurrently transmitting a continuous wave (and receiving uplink information) in the higher band.

Aspects of the disclosure are initially described in the context of wireless communications systems. Aspects of the disclosure are further illustrated by and described with reference to radio frequency spectrum band configurations, a process flow, apparatus diagrams, system diagrams, and flowcharts that relate to interference mitigation for envelope detection in ambient IoT communications.

FIG. 1 shows an example of a wireless communications system 100 that supports interference mitigation for envelope detection in ambient IoT communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support interference mitigation for envelope detection in ambient IoT communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Passive bandpass filtering techniques may be used by wireless communications devices such as UEs 115 and network entities 105 to isolate or filter out one or more frequencies that lie within a band or range of frequencies. The cut-off frequency or fc point in a bandpass filter may be controlled using a single resistor in series with a non-polarized capacitor, whose ordering determines whether the filter is a high-pass filter or a low-pass filter. A bandpass filter may allow wireless communication devices to receive and process signals within a certain "band" or "spread" of frequencies without distorting the input signal or introducing extra noise. In some examples, low-cost passive bandpass filtering may be used for frequencies of hundreds of kHz in the 400-900 MHz range (e.g., 0.02% 3 dB fractional bandwidth for 418 MHz equates to ~84 kHz of bandpass filtering range) for surface acoustic wave and surface mounted devices. In some other examples, passive bandpass filter designs may operate in relatively higher frequency bands (e.g., ~50 MHz FBW in 2.5 GHz band) using passive Substrate-Integrated Waveguide (SIW) fabrication. Some other designs of passive filters (e.g., microstrip-line based filters) support relatively smaller frequency ranges (e.g., ~100 MHz). Some passive bandpass filters may also be used to isolate or filter out certain frequencies that lie within different frequency ranges, or may be used for other signal detection and processing techniques such as envelope detection.

Devices operating in the wireless communications system 100 may implement envelope decoding techniques to detect certain waveform types used to carry data. Envelope detection techniques may be used by low-power devices such as a passive tag, a UE 115, or other ambient IoT devices to detect propagating waveforms and recover the encoded data while supporting the low-complexity, low cost, and low energy targets. In some implementations, however, envelope tracking and decoding may suffer from co-channel transmissions and interference from neighboring network entities 105 or from concurrent transmissions from a same network entity 105 to other nearby receiving devices. In such examples, a UE 115 may receive a cumulative signal envelope from multiple different sources, which may disrupt the envelope tracking operations and degrade overall communication quality due to interference.

To support efficient envelope detection techniques and to reduce the effects of both co-channel transmission interference and interference from other ambient IoT transmissions, the wireless communications system 100 may support a dual-band configuration. For example, downlink data transmission may occur on a lower band (e.g., a 700 MHz band), while continuous wave transmission (used for backscattering) and other uplink communications occurs on a higher band (e.g., a 4 GHz band). In such dual-band configurations, the uplink and downlink bands may be significantly separated in frequency to allow for passive filtering techniques and dual-tone filtering on the downlink band to reduce co-source transmission interference, while the higher band can be used to support device-originated traffic from a relatively large number of ambient IoT devices or tags present in the wireless communications system 100.

Figure 2:
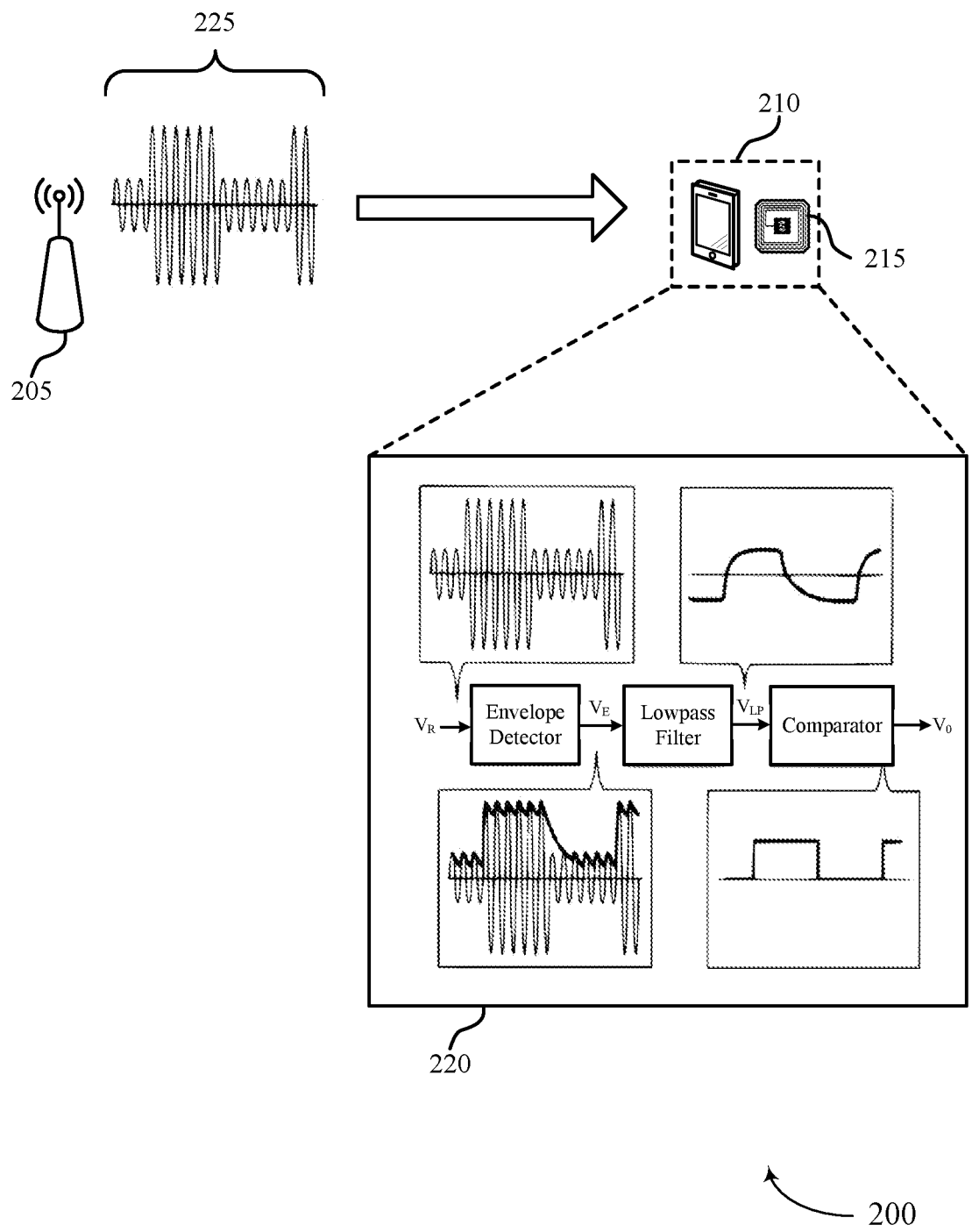

FIG. 2 shows an example of a wireless communications system 200 that supports interference mitigation for envelope detection in ambient IoT communications in accordance with one or more aspects of the present disclosure. In some examples, the wireless communications system 200 may implement or be implemented by aspects of the wireless communications system 100. For example, the wireless communications system 200 may include a reader device 205 and an ambient IoT device 210, which may be examples of corresponding devices described herein, including with reference to FIG. 1. In some cases, the reader device 205 may be an example of a network entity or other network node, a UE, or any other device capable of supporting ambient IoT communications. In some cases, the ambient IoT device 210 may be an example of a passive or ambient tag (e.g., an RFID tag), a UE, a network device, or any other device capable of supporting ambient IoT communications.

In some cases, ambient IoT devices may be associated with passive or ambient communication technologies (e.g., backscatter communications), which may be associated with low power communications (e.g., including communications that support low power consumption for devices and low overall network power consumption), low device cost, or both. In some examples, the wireless communications system 200 may support RFID technologies. For example, an RFID system may support low powered backscattering communications using RFID "tags" to automatically capture data using a small microchip 215 attached to an object such as a UE or integrated within a device (e.g., within the ambient IoT device 210), and one or more "reader" devices are used to scan or send information to the tag.

The wireless communications system 200 may implement envelope tracking techniques to detect certain waveform types used to carry data. For example, some such envelope detection methods such as envelope detection method 220 take a relatively high-frequency amplitude modulated signal 225 as input (e.g., $V_R$) into an envelope detector, which is output as an output $V_E$ to a lowpass filter, which is output as a filtered signal $V_{LP}$ for further processing by a comparator, which outputs a processed signal $V_O$, which is the demodulated envelope or shape of the original signal $V_R$.

Envelope detection techniques may be used by a low-power device, such as a passive tag, a UE, or any other device such as the ambient IoT device 210, to detect propagating waveforms and recover the encoded data while supporting the low-complexity, low cost, and low energy targets associated with ambient IoT systems. Envelope detection techniques may also enable simpler device designs (e.g., low-tier devices), including some low-cost designs that operate without active radio frequency (RF) components. Envelope detection may also be utilized by devices that support downlink reception without down conversion, and without the need for carrier frequency offset or frequency synchronization at the receiver. For example, envelope detection techniques may be used by ambient IoT devices and passive tags to detect signals modulated with amplitude shift keying (ASK) and phase shift keying (PSK), among other modulation schemes, with or without a local oscillator.

In some cases, however, envelope tracking and decoding may suffer from co-channel transmissions such as interference from neighboring network entities or from concurrent transmissions (e.g., control transmissions, data transmissions) from a same network entity to other nearby receiving devices. For example, a same network entity may communicate multiple conflicting downlink transmissions to both an ambient IoT device and an enhanced mobile broad band (eMBB) or ultra-reliable low-latency (URLLC) UE during an in-band deployment of ambient IoT. In such examples, the ambient IoT device 210 may detect an envelope that is a cumulative signal over all transmissions it receives, including the desired signal transmission, other co-source transmissions, transmissions from other neighboring network entities, among other transmissions. The detected envelope, therefore, may be affected by interference by several sources which may disrupt the envelope tracking operations of the receiving device, and degrade overall communication quality.

The wireless communications system 200 may implement various different techniques. In some implementations, techniques may be used increase the power spectral density (e.g., 8-15 dB boost) for Ambient IoT, or time division multiplexing operation may be employed to reduce the effects of co-channel transmission interference. In some other implementations, helper-tone or dual-tone techniques may be used to increase envelope tracking and detection performance. For example, the ambient IoT device 210 may receive an indication of a delta-frequency of a dual-tone downlink transmission which defines a frequency difference between two tones used for the dual-tone downlink transmission. The ambient IoT device 210 may receive the dual-tone downlink transmission over the two tones (e.g., the two tones separated by the delta-frequency in the frequency domain), and may decode the data from the dual-tone downlink transmission based on the delta-frequency. Such techniques may allow the ambient IoT device 210 to identify interference from resource blocks that include other ambient IoT transmissions from neighboring network entities, but may still include interference from co-channel transmissions.

To address both co-channel transmission interference and interference from other ambient IoT transmissions, the wireless communications system 200 may support a dual-band configuration to mitigate the co-channel interference that arises from envelope detection in ambient IoT deployments. For example, downlink data transmission (e.g., control information sent from a network entity or reader device 205 to an ambient IoT device 210 or UE) may occur on a lower band (e.g., 700 MHz), while continuous wave transmission (transmitted from the network entity or reader device 205 to use for backscattering by the ambient IoT device 210) and other uplink transmissions (from the ambient IoT device 210 or UE to the reader device 205 or network entity) occurs on a higher band (e.g., 4 GHZ). The uplink and downlink bands may be significantly separated in frequency (e.g., more so than in licensed assisted access, frequency division duplexing, or cross-carrier scheduling), which may allow the ambient IoT device 210 to more effectively perform passive filtering techniques and dual-tone filtering on the downlink band to reduce co-source transmission interference, while the higher band (with larger bandwidth) can be used to support device-originated traffic from a relatively large number of ambient IoT devices or tags present in the wireless communications system 200.

In some examples, the ambient IoT device 210 may receive downlink information using different oscillators, antennas, or a combination thereof, than those used for backscattering in the higher band. Additionally or alternatively, the reader device 205 may be capable of transmitting downlink information in the lower band while transmitting a continuous wave (for backscattering and for wireless power transfer (WPT)) and receiving uplink information in the higher band. Both the ambient IoT device 210 and the reader device 205 may support uplink and downlink ambient IoT communications via corresponding uplink and downlink bands separated by several GHz of bandwidth.

Figure 3:
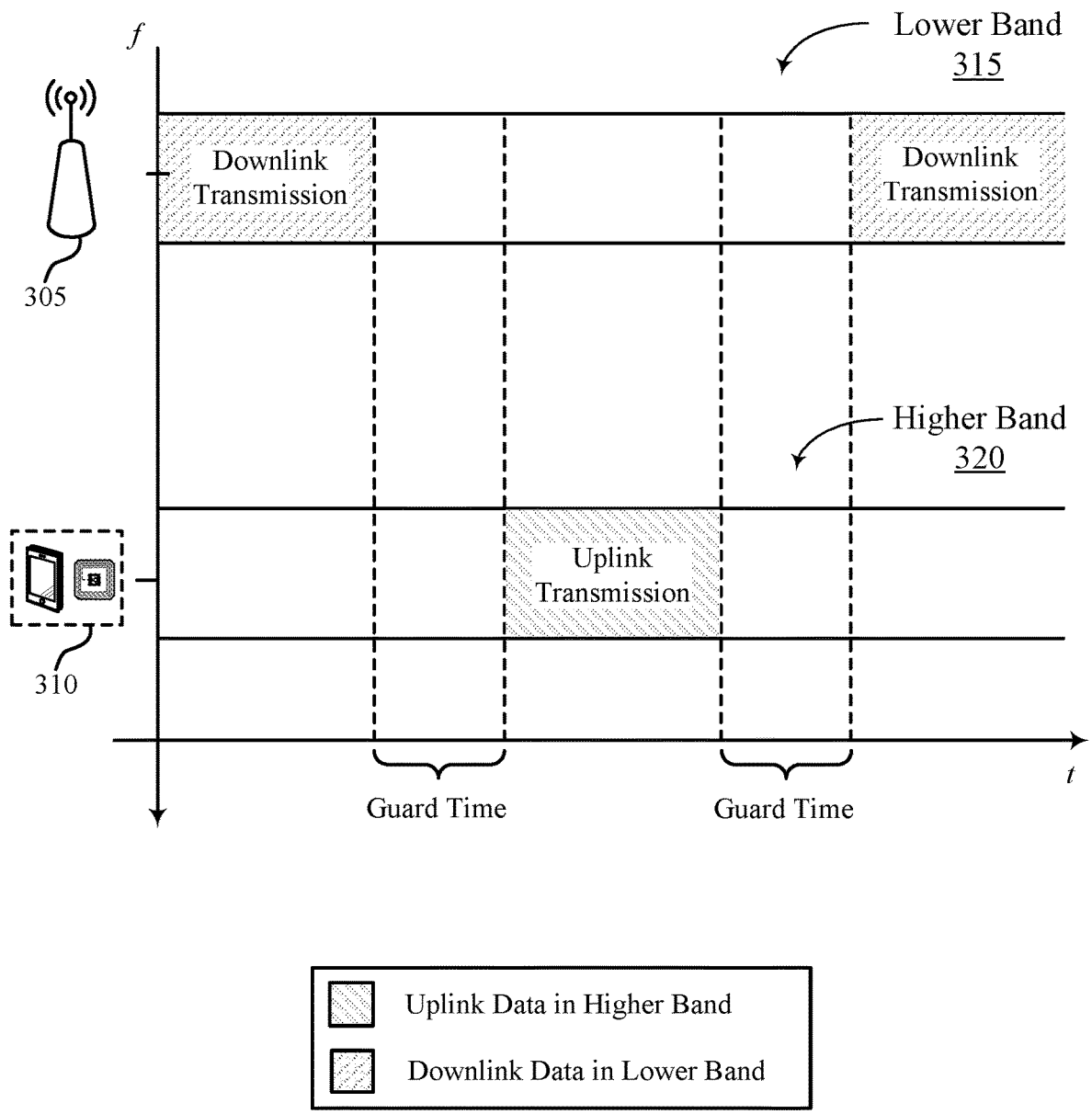
FIG. 3 shows an example of a radio frequency spectrum band configuration that supports interference mitigation for envelope detection in ambient IoT communications in accordance with one or more aspects of the present disclosure.

FIG. 3 shows an example of a radio frequency spectrum band configuration 300 that supports interference mitigation for envelope detection in ambient IoT communications in accordance with one or more aspects of the present disclosure. In some examples, the radio frequency spectrum band configuration 300 may implement or be implemented by aspects of the wireless communications systems 100 and 200. For example, the radio frequency spectrum band configuration 300 may illustrate communications between a reader device 305 and an ambient IoT device 310, which may be examples of corresponding devices described herein, including with reference to FIGS. 1 and 2. In some cases, the reader device 305 may be an example of a network entity or other network node, a UE, or any other device capable of supporting ambient IoT communications. In some cases, the ambient IoT device 310 may be an example of a passive or ambient tag (e.g., an RFID tag), a UE, a network device, or any other device capable of supporting ambient IoT communications.

The radio frequency spectrum band configuration 300 may be a dual-band configuration that supports dual-band ambient IoT operation. For example, downlink communications (e.g., control messages such as physical downlink control channel (PDCCH) transmissions from the reader device 305 sent to the ambient IoT device 310) may occur on a lower band 315 (e.g., 700 MHZ). In some cases, the lower band 315 may be an example of a narrowband IoT B12 band. In addition, uplink communications and continuous wave transmission (transmitted from the reader device 305 to use for backscattering by the ambient IoT device 310) may occur on a higher band 320 (e.g., 4 GHz).

The ambient IoT device 310 (or multiple ambient IoT devices or tags) may be equipped with one or more passive bandpass filters to reject or otherwise filter the co-channel transmissions and other interference from network entities communicating in the lower band 315. After performing bandpass filtering, the ambient IoT device 310 may perform envelope detection to detect the downlink signal on the lower band 315. In such cases, at least some of the channel interference has been filtered out using passive techniques, allowing for more efficient envelope detection at the ambient IoT device 310. In some other examples, the ambient IoT device 310 may perform interference mitigation using other filtering techniques to reduce co-source interference, helper-tone or dual-tone techniques to reduce interference from other network entities, or a combination thereof.

The ambient IoT device 310 may also transmit uplink communications or perform backscattering (or other passive communications) using the higher band 320. In addition, the reader device 305 may receive the uplink communications from the ambient IoT device 310 in the higher band 320, while also transmitting a continuous waveform on the higher band 320. For example, the reader device 305 may transmit a continuous waveform via the higher band 320, and the ambient IoT device 310 may use the continuous waveform to modulate and send uplink communications with little to no power. In addition, the higher band 320 may support relatively higher traffic rates (e.g., device-originated traffic having RFID rates up to 128-kbps for downlink traffic and 640-kbps for uplink traffic), higher ambient IoT device density, and higher tag density relative to the lower band 315, which may reduce the bandwidth requirements and reduce congestion in the lower band 315.

In some examples, the uplink band (e.g., the higher band 320) and the downlink band (e.g., the lower band 315) may be significantly separated in frequency, which may allow the ambient IoT device 310 to more effectively perform passive filtering techniques and dual-tone filtering on the downlink band to reduce co-source transmission interference, while the higher band (with larger bandwidth) can be used to support device-originated traffic from a relatively large number of ambient IoT devices or tags accessing the radio frequency spectrum band configuration 300.

In some examples, the ambient IoT device 310 may receive downlink information on the lower band 315 using different oscillators or antennas than those used for backscattering uplink communications in the higher band 320. For example, the ambient IoT device 310 may receive a downlink transmission in the lower band 315 and may use the guard time to prepare for transmission or backscattering in the higher band 320. Additionally or alternatively, the reader device 305 may be capable of transmitting downlink information in the lower band 315 while transmitting a continuous wave (and receiving uplink information) in the higher band 320. In some examples, the higher band 320 and the lower band 315 may be separated by a threshold frequency gap (e.g., greater than 1 GHz). In some other examples, the higher band 320 and the lower band 315 may be configured as a frequency band pair for ambient IoT communications.

Figure 4:
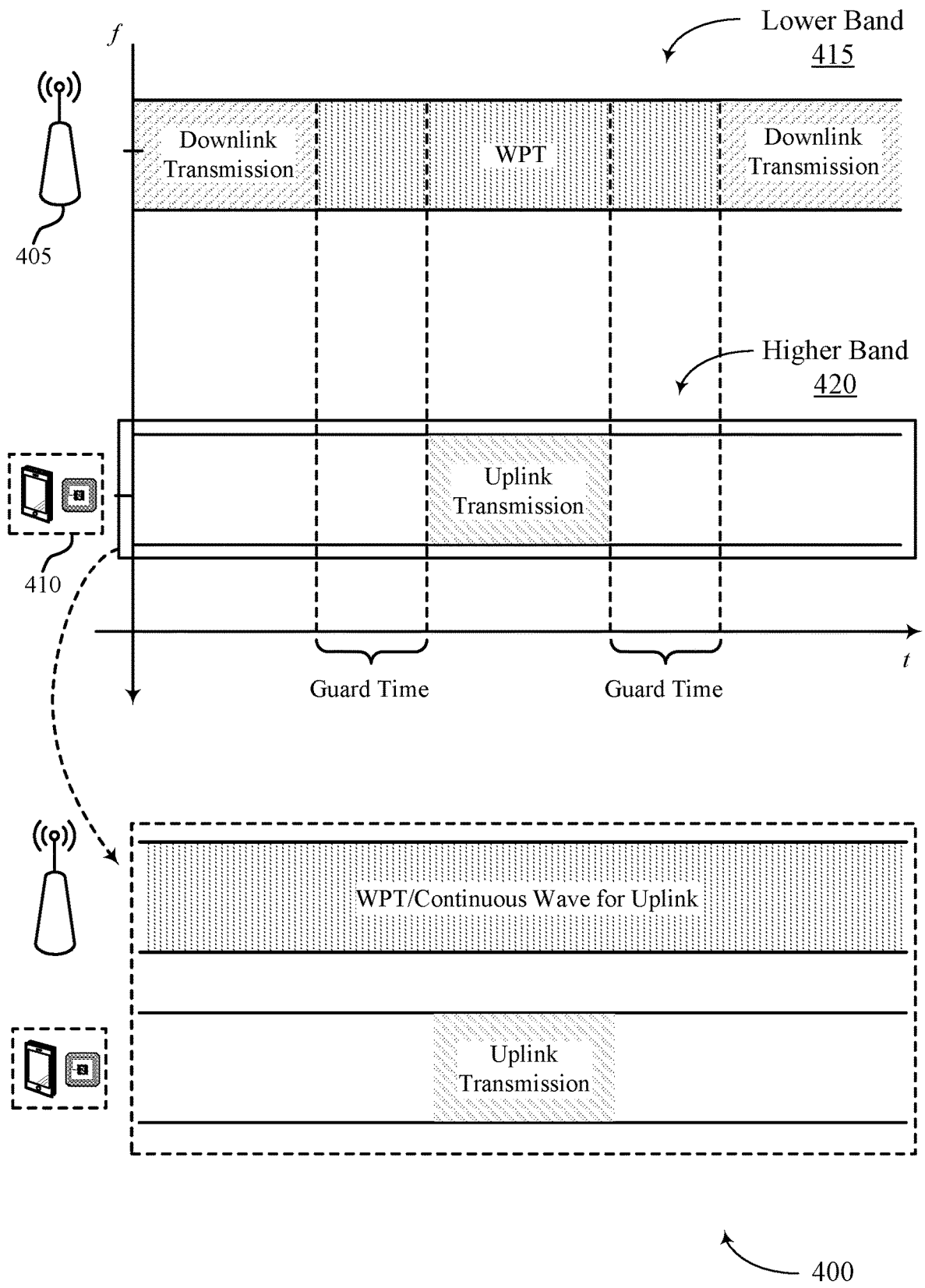
FIG. 4 shows an example of a radio frequency spectrum band and wireless power transfer (WPT) configuration that supports interference mitigation for envelope detection in ambient IoT communications in accordance with one or more aspects of the present disclosure.

FIG. 4 shows an example of a radio frequency spectrum band and WPT configuration 400 that supports interference mitigation for envelope detection in ambient IoT communications in accordance with one or more aspects of the present disclosure. In some examples, the radio frequency spectrum band and WPT configuration 400 may implement or be implemented by aspects of the wireless communications systems 100 and 200. For example, the radio frequency spectrum band and WPT configuration 400 may illustrate communications between a reader device 405 and an ambient IoT device 410, which may be examples of corresponding devices described herein, including with reference to FIGS. 1 and 2. In some cases, the reader device 405 may be an example of a network entity or other network node, a UE, or any other device capable of supporting ambient IoT communications. In some cases, the ambient IoT device 410 may be an example of a passive or ambient tag (e.g., an RFID tag), a UE, a network device, or any other device capable of supporting ambient IoT communications.

The radio frequency spectrum band and WPT configuration 400 may be a dual-band configuration that supports dual-band ambient IoT operation. For example, downlink communications (e.g., control messages such as PDCCH transmissions from the reader device 405 sent to the ambient IoT device 410) may occur on a lower band 415 (e.g., 700 MHZ). In addition, uplink communications and continuous wave transmission (transmitted from the reader device 405 to use for backscattering by the ambient IoT device 410) may occur on a higher band 420 (e.g., 4 GHZ).

In some implementations, the radio frequency spectrum band and WPT configuration 400 may support WPT between devices or other types of energy harvesting techniques. For example, the reader device 405 may transmit WPT communications to the ambient IoT device 410 using the lower band 415, the higher band 420, or both. In some examples, WPT communications via the lower band 415 may be used at times in which increased communication range and low pathloss are advantageous. In some other examples, WPT communications via the higher band 420 may be used at times in which the lower band is experiencing high traffic rates, during times where the ambient IoT device 410 is spatially close to the reader device 405, or during other times. In some examples, the ambient IoT device may receive WPT communications via the higher band 420 while receiving downlink communications via the lower band 415. Additionally or alternatively, the ambient IoT device 410 may receive the WPT communications via the lower band 415 while transmitting uplink communications via the higher band 420.

Figure 5:
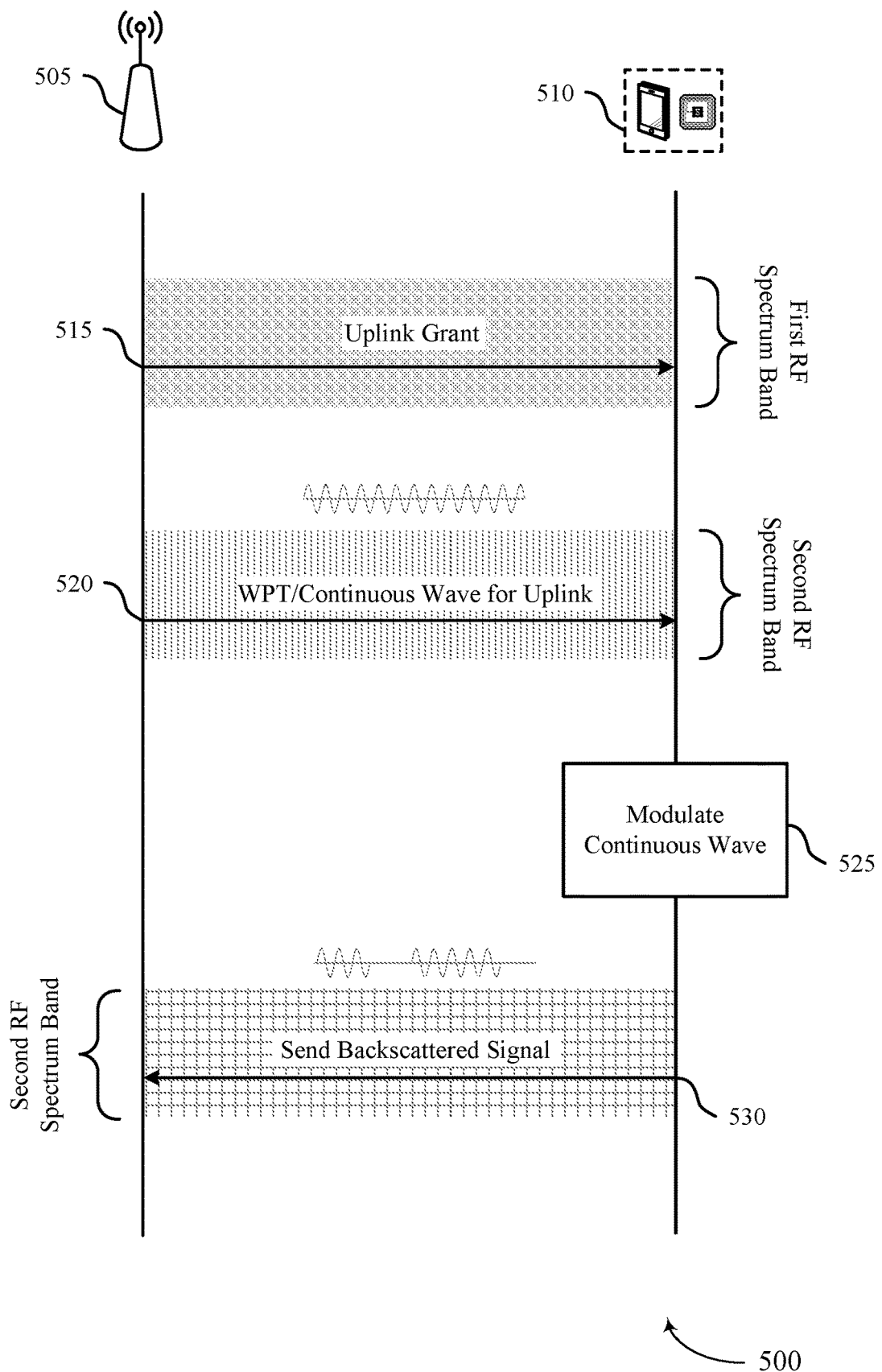
FIG. 5 shows an example of a process flow that supports interference mitigation for envelope detection in ambient IoT communications in accordance with one or more aspects of the present disclosure.

FIG. 5 shows an example of a process flow 500 that supports interference mitigation for envelope detection in ambient IoT communications in accordance with one or more aspects of the present disclosure. For example, the process flow 500 may illustrate communications between a reader device 505 and an ambient IoT device 510, which may be examples of corresponding devices described herein, including with reference to FIGS. 1 and 2. In some cases, the reader device 505 may be an example of a network entity or other network node, a UE, or any other device capable of supporting ambient IoT communications. In some cases, the ambient IoT device 510 may be an example of a passive or ambient tag (e.g., an RFID tag), a UE, a network device, or any other device capable of supporting ambient IoT communications.

In the following description of process flow 500, the operations may be performed in a different order than the order shown, or other operations may be added or removed from the process flow 500. For example, some operations may also be left out of process flow 500, may be performed in different orders or at different times, or other operations may be added to process flow 500. Although the ambient IoT device 510 and the reader device 505 are shown performing the operations of process flow 500, some aspects of some operations may also be performed by one or more other wireless devices, ambient IoT devices, RFID devices, or network devices.

At 515, the ambient IoT device 510 may receive, via a first radio frequency spectrum band, a control message that includes an uplink grant for the ambient IoT device 510 to send, via a second radio frequency spectrum band, one or more backscattered uplink messages. In some examples, the ambient IoT device 510 may receive one or more downlink signals via the first radio frequency spectrum band that are a set of co-source transmissions. The ambient IoT device may then perform one or more passive bandpass filtering operations to filter the set of co-source transmissions from the one or more downlink signals, and may perform an envelope detection operation on the one or more downlink signals after performing the passive bandpass filtering.

In some other examples, the ambient IoT device 510 may receive one or more downlink signals via the first radio frequency spectrum band that include a first set of downlink signals from the reader device 505 and a second set of interfering downlink signals from another reader device or network entity. The ambient IoT device 510 may then perform a dual-tone decoding operation to separate the first set of downlink signals from the second set of interfering downlink signals, and may perform an envelope detection operation on the one or more downlink signals after performing the dual-tone decoding operation.

At 520, the ambient IoT device 510 may receive, from the reader device 505, a continuous waveform via the second radio frequency spectrum band. In some examples, the second radio frequency spectrum band is higher in frequency than the first radio frequency spectrum band, and is separated from the first radio frequency spectrum band by at least a threshold frequency gap (e.g., at least 1 GHz frequency gap).

In some examples, the ambient IoT device 510 may receive, as part of a WPT procedure, WPT signaling from the reader device 505 via the first radio frequency spectrum band, the second radio frequency spectrum band, or both. In some cases, the ambient IoT device 510 may send the backscattered signal of the continuous waveform via the second radio frequency spectrum band while concurrently receiving the WPT signaling via the first radio frequency spectrum band. In some other cases, the ambient IoT device 510 may receive one or more downlink messages via the first radio frequency spectrum band while concurrently receiving the WPT signaling via the second radio frequency spectrum band.

At 525, the ambient IoT device 510 may modulate the continuous waveform with uplink data of the one or more backscattered uplink messages.

At 530, the ambient IoT device may send, via the second radio frequency spectrum band, a backscattered signal of the continuous waveform (including the uplink data) using the modulated waveform. In some examples, the backscattered signal may be sent using a variation in the envelope (e.g., via ASK, exhibiting two-levels of peaks in the signal) that is different from the original continuous wave received from the reader device 505.

In some examples, the first radio frequency spectrum band comprises a first set of radio frequencies associated with narrow-band IoT (NB-IoT) communications and the second radio frequency spectrum band comprises a second set of radio frequencies associated with industrial IoT (I-IoT) communications. In some examples, the first radio frequency spectrum band and the second radio frequency spectrum band comprise a set of one or more paired radio frequency spectrum bands associated with ambient IoT communications. In some examples, the second radio frequency spectrum band is associated with higher traffic rates and higher user density relative to the first radio frequency spectrum band.

Figure 6:
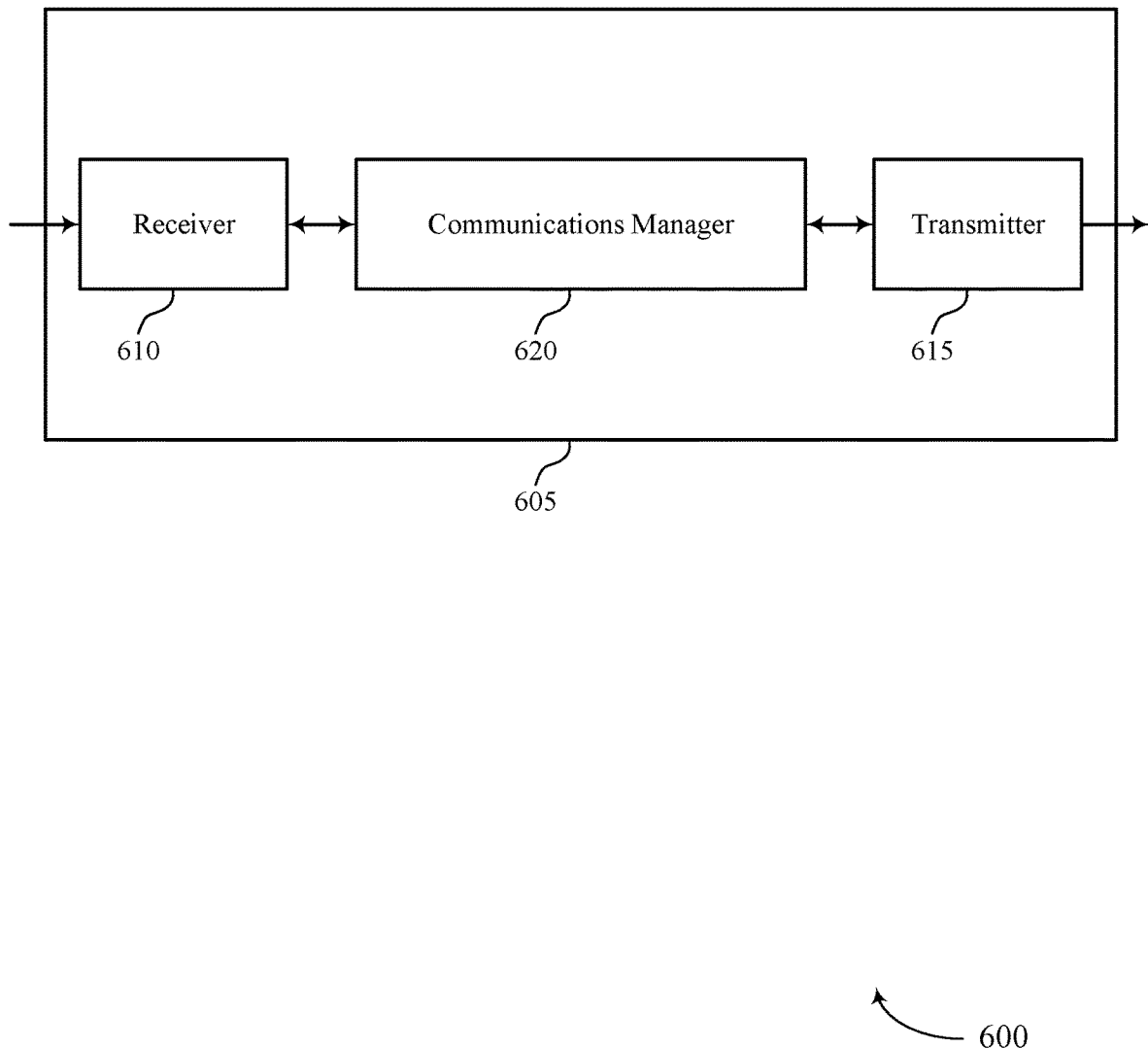
FIGS. 6 and 7 show block diagrams of devices that support interference mitigation for envelope detection in ambient IoT communications in accordance with one or more aspects of the present disclosure.

FIG. 6 shows a block diagram 600 of a device 605 that supports interference mitigation for envelope detection in ambient IoT communications in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to interference mitigation for envelope detection in ambient IoT communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to interference mitigation for envelope detection in ambient IoT communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of interference mitigation for envelope detection in ambient IoT communications as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless communication device in accordance with examples as disclosed herein. For example, the communications manager 620 is capable of, configured to, or operable to support a means for receiving, via a first radio frequency spectrum band, a control message including an uplink grant for the first wireless communication device to send, via a second radio frequency spectrum band, one or more backscattered uplink messages. The communications manager 620 is capable of, configured to, or operable to support a means for receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The communications manager 620 is capable of, configured to, or operable to support a means for modulating the continuous waveform with uplink data of the one or more backscattered uplink messages based on receiving the continuous waveform. The communications manager 620 is capable of, configured to, or operable to support a means for sending, via the second radio frequency spectrum band, a backscattered signal of the continuous waveform based on modulating the continuous waveform with the uplink data, where the backscattered signal includes the one or more backscattered uplink messages.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced device processing, reduced power consumption, reduced device cost, reduced interference, and reduced device complexity.

Figure 7:
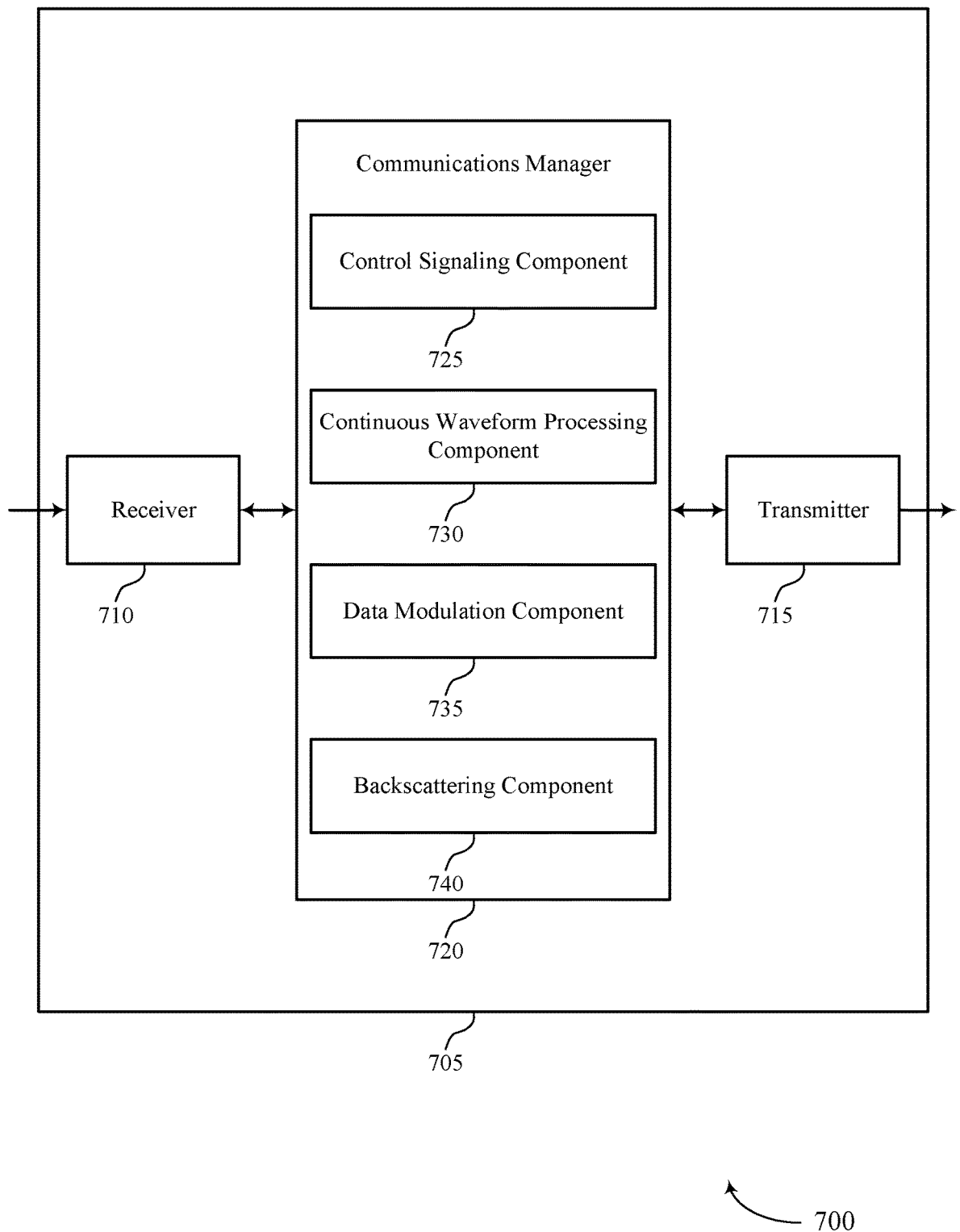

FIG. 7 shows a block diagram 700 of a device 705 that supports interference mitigation for envelope detection in ambient IoT communications in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to interference mitigation for envelope detection in ambient IoT communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to interference mitigation for envelope detection in ambient IoT communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of interference mitigation for envelope detection in ambient IoT communications as described herein. For example, the communications manager 720 may include a control signaling component 725, a continuous waveform processing component 730, a data modulation component 735, a backscattering component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless communication device in accordance with examples as disclosed herein. The control signaling component 725 is capable of, configured to, or operable to support a means for receiving, via a first radio frequency spectrum band, a control message including an uplink grant for the first wireless communication device to send, via a second radio frequency spectrum band, one or more backscattered uplink messages. The continuous waveform processing component 730 is capable of, configured to, or operable to support a means for receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The data modulation component 735 is capable of, configured to, or operable to support a means for modulating the continuous waveform with uplink data of the one or more backscattered uplink messages based on receiving the continuous waveform. The backscattering component 740 is capable of, configured to, or operable to support a means for sending, via the second radio frequency spectrum band, a backscattered signal of the continuous waveform based on modulating the continuous waveform with the uplink data, where the backscattered signal includes the one or more backscattered uplink messages.

Figure 8:
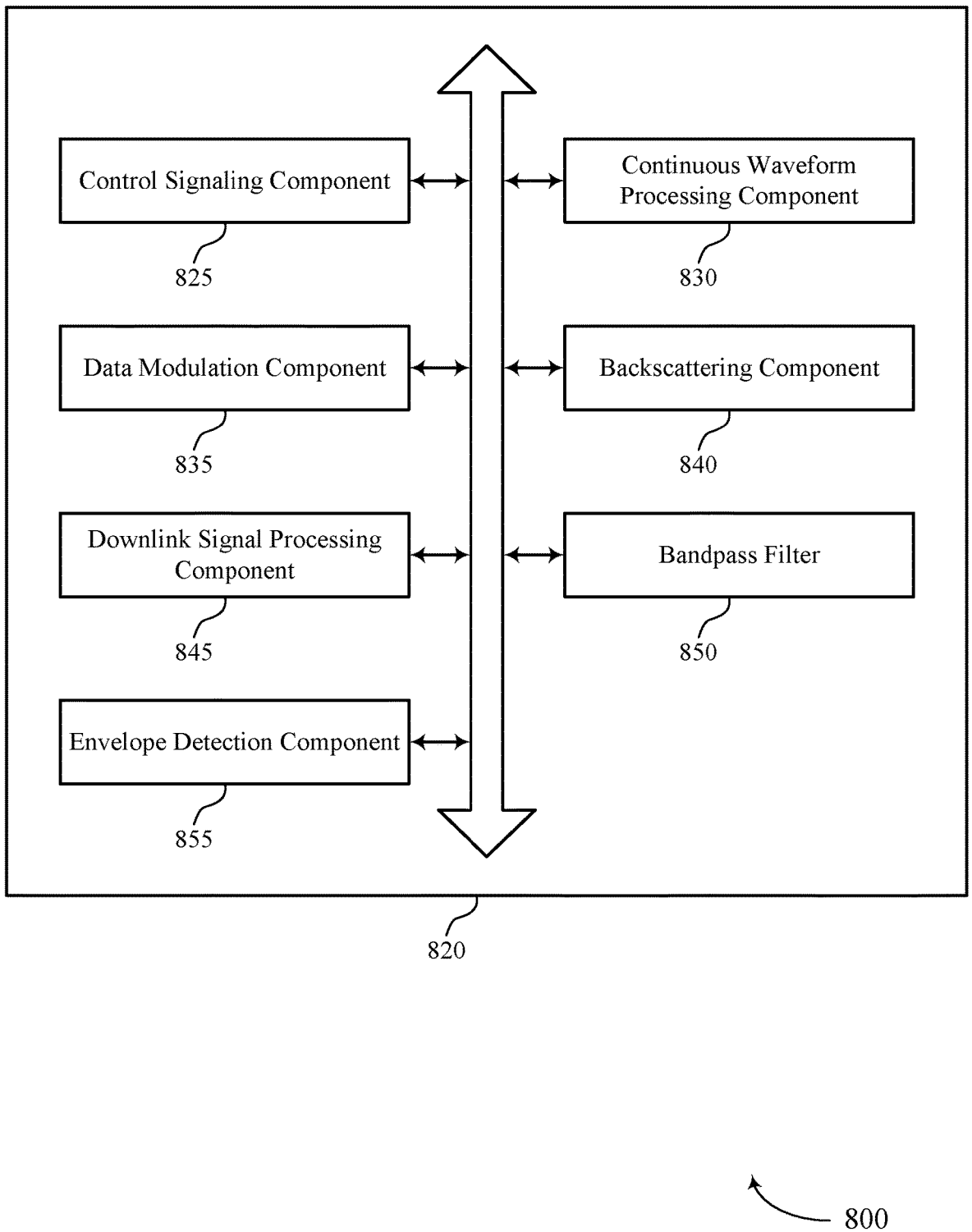
FIG. 8 shows a block diagram of a communications manager that supports interference mitigation for envelope detection in ambient IoT communications in accordance with one or more aspects of the present disclosure.

FIG. 8 shows a block diagram 800 of a communications manager 820 that supports interference mitigation for envelope detection in ambient IoT communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of interference mitigation for envelope detection in ambient IoT communications as described herein. For example, the communications manager 820 may include a control signaling component 825, a continuous waveform processing component 830, a data modulation component 835, a backscattering component 840, a downlink signal processing component 845, a bandpass filter 850, an envelope detection component 855, or any combination thereof. Each of these components, or components or subcomponents thereof (e.g., one or more processors, one or more memories), may communicate, directly or indirectly, with one another (e.g., via one or more buses).

The communications manager 820 may support wireless communications at a first wireless communication device in accordance with examples as disclosed herein. The control signaling component 825 is capable of, configured to, or operable to support a means for receiving, via a first radio frequency spectrum band, a control message including an uplink grant for the first wireless communication device to send, via a second radio frequency spectrum band, one or more backscattered uplink messages. The continuous waveform processing component 830 is capable of, configured to, or operable to support a means for receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The data modulation component 835 is capable of, configured to, or operable to support a means for modulating the continuous waveform with uplink data of the one or more backscattered uplink messages based on receiving the continuous waveform. The backscattering component 840 is capable of, configured to, or operable to support a means for sending, via the second radio frequency spectrum band, a backscattered signal of the continuous waveform based on modulating the continuous waveform with the uplink data, where the backscattered signal includes the one or more backscattered uplink messages.

In some examples, the downlink signal processing component 845 is capable of, configured to, or operable to support a means for receiving one or more downlink signals via the first radio frequency spectrum band, the one or more downlink signals including at least a set of co-source transmissions. In some examples, the bandpass filter 850 is capable of, configured to, or operable to support a means for performing one or more passive bandpass filtering operations to filter the set of co-source transmissions from the one or more downlink signals.

In some examples, the envelope detection component 855 is capable of, configured to, or operable to support a means for performing an envelope detection operation on the one or more downlink signals after performing the one or more passive bandpass filtering operations to filter the set of co-source transmissions from the one or more downlink signals.

In some examples, the downlink signal processing component 845 is capable of, configured to, or operable to support a means for receiving one or more downlink signals via the first radio frequency spectrum band, the one or more downlink signals including both a first set of downlink signals from the second wireless communication device and a second set of interfering downlink signals from a third wireless device. In some examples, the downlink signal processing component 845 is capable of, configured to, or operable to support a means for performing a dual-tone decoding operation to separate the first set of downlink signals from the second set of interfering downlink signals.

In some examples, the envelope detection component 855 is capable of, configured to, or operable to support a means for performing an envelope detection operation on the one or more downlink signals after performing the dual-tone decoding operation to separate the first set of downlink signals from the second set of interfering downlink signals.

In some examples, the continuous waveform processing component 830 is capable of, configured to, or operable to support a means for receiving, as part of a wireless power transfer procedure, wireless power transfer signaling from the second wireless communication device via the first radio frequency spectrum band, the second radio frequency spectrum band, or both.

In some examples, the backscattering component 840 is capable of, configured to, or operable to support a means for sending, concurrently with receiving the wireless power transfer signaling via the first radio frequency spectrum band, the backscattered signal of the continuous waveform via the second radio frequency spectrum band.

In some examples, the downlink signal processing component 845 is capable of, configured to, or operable to support a means for receiving, concurrently with receiving the wireless power transfer signaling via the first radio frequency spectrum band, one or more downlink messages via the first radio frequency spectrum band.

In some examples, the threshold frequency gap includes a frequency gap greater than 1 gigahertz (GHz).

In some examples, the first radio frequency spectrum band includes a first set of radio frequencies associated with narrow-band IoT communications and the second radio frequency spectrum band includes a second set of radio frequencies associated with industrial IoT communications.

In some examples, the first radio frequency spectrum band and the second radio frequency spectrum band include a set of one or more paired radio frequency spectrum bands associated with ambient IoT communications.

In some examples, the second radio frequency spectrum band is associated with higher traffic rates and higher user density relative to the first radio frequency spectrum band.

In some examples, the first wireless communication device includes an ambient IoT device, a low-power tag device, a UE, or any combination thereof.

In some examples, the second wireless communication device includes an ambient IoT device, a reader device, a network entity, a UE, or any combination thereof.

Figure 9:
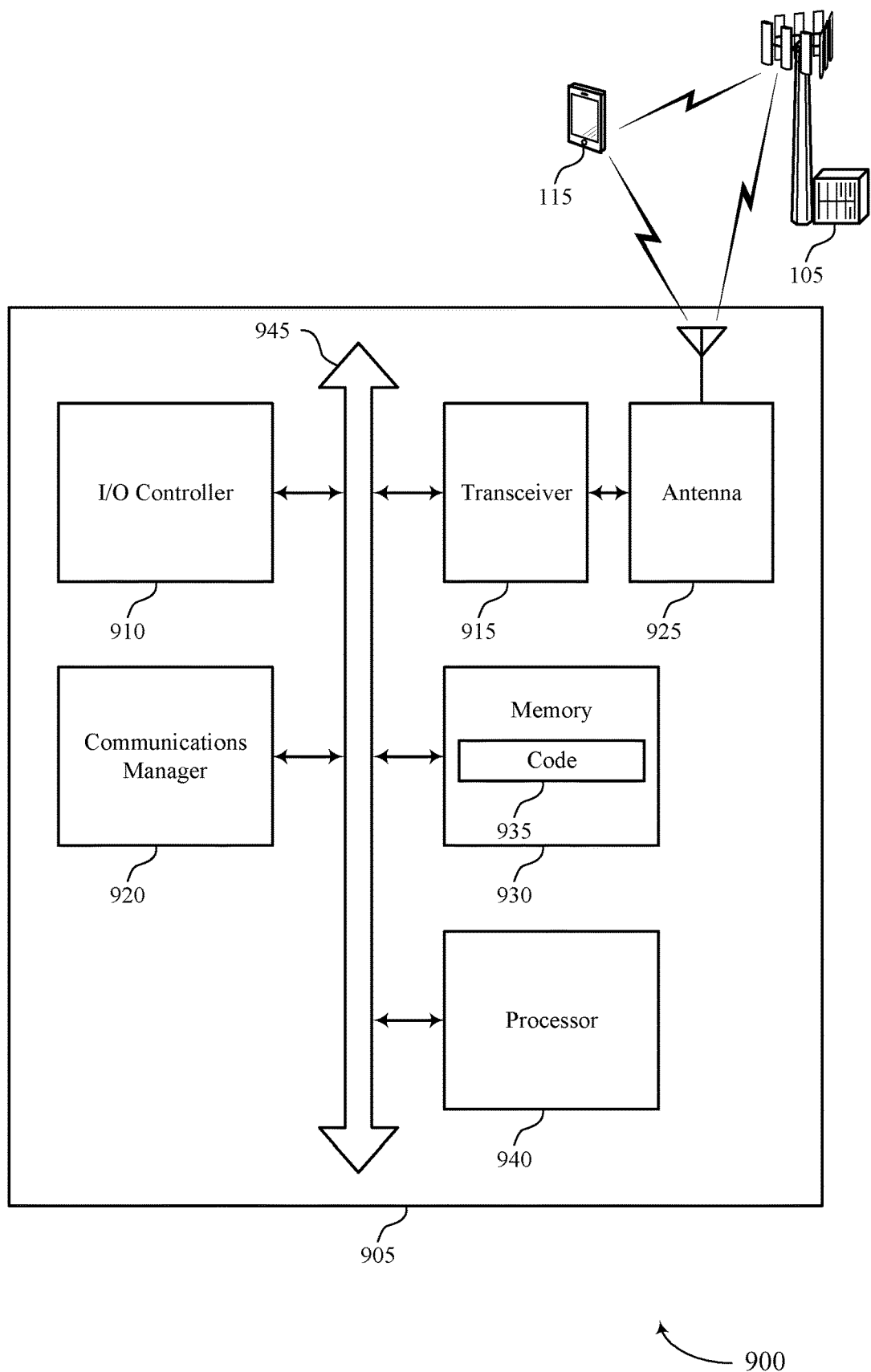
FIG. 9 shows a diagram of a system including a device that supports interference mitigation for envelope detection in ambient IoT communications in accordance with one or more aspects of the present disclosure.

FIG. 9 shows a diagram of a system 900 including a device 905 that supports interference mitigation for envelope detection in ambient IoT communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting interference mitigation for envelope detection in ambient IoT communications). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communications at a first wireless communication device in accordance with examples as disclosed herein. For example, the communications manager 920 is capable of, configured to, or operable to support a means for receiving, via a first radio frequency spectrum band, a control message including an uplink grant for the first wireless communication device to send, via a second radio frequency spectrum band, one or more backscattered uplink messages. The communications manager 920 is capable of, configured to, or operable to support a means for receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The communications manager 920 is capable of, configured to, or operable to support a means for modulating the continuous waveform with uplink data of the one or more backscattered uplink messages based on receiving the continuous waveform. The communications manager 920 is capable of, configured to, or operable to support a means for sending, via the second radio frequency spectrum band, a backscattered signal of the continuous waveform based on modulating the continuous waveform with the uplink data, where the backscattered signal includes the one or more backscattered uplink messages.

By including or configuring the communications manager 920 in accordance with examples as described herein, the device 905 may support techniques for reduced device processing, reduced power consumption, reduced device cost, reduced interference, and reduced device complexity improved communication reliability, reduced latency, more efficient utilization of communication resources and communication bands, longer battery life, improved utilization of processing capability, increased envelope detection efficiency, and increased signal filtering efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of interference mitigation for envelope detection in ambient IoT communications as described herein, or the at least one processor 940 and the at least one memory 930 may be otherwise configured to, individually or collectively, perform or support such operations.

Figure 10:
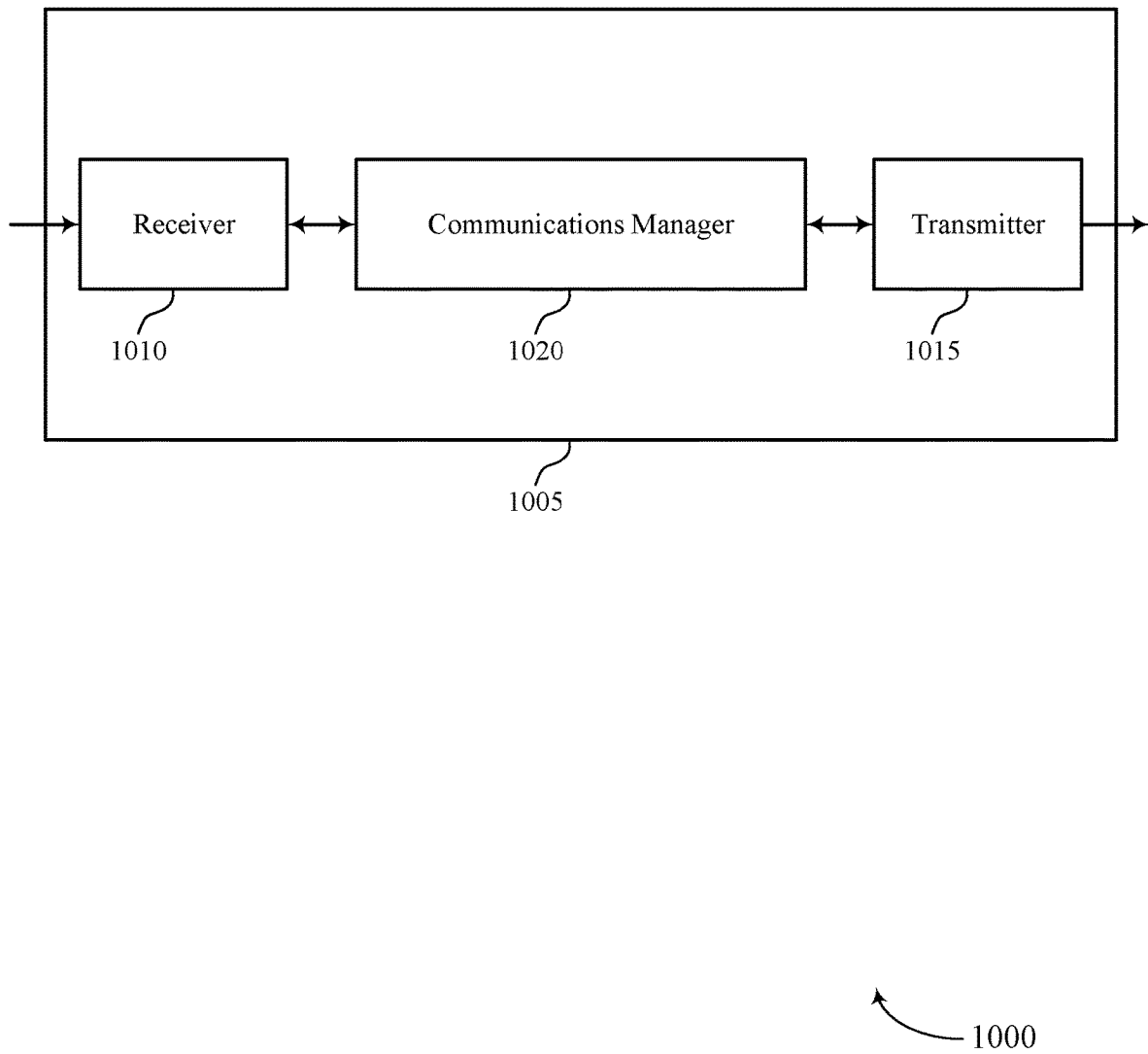
FIGS. 10 and 11 show block diagrams of devices that support interference mitigation for envelope detection in ambient IoT communications in accordance with one or more aspects of the present disclosure.

FIG. 10 shows a block diagram 1000 of a device 1005 that supports interference mitigation for envelope detection in ambient IoT communications in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of interference mitigation for envelope detection in ambient IoT communications as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first wireless communication device in accordance with examples as disclosed herein. For example, the communications manager 1020 is capable of, configured to, or operable to support a means for transmitting, via a first radio frequency spectrum band, a control message including an uplink grant for a second wireless communication device to send, via a second radio frequency spectrum band, one or more backscattered uplink messages. The communications manager 1020 is capable of, configured to, or operable to support a means for transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The communications manager 1020 is capable of, configured to, or operable to support a means for transmitting the continuous waveform via the second radio frequency spectrum band. The communications manager 1020 is capable of, configured to, or operable to support a means for receiving, via the second radio frequency spectrum band, a backscattered signal of the continuous waveform based on transmitting the continuous waveform, where the backscattered signal includes the one or more backscattered uplink messages.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced device processing, reduced power consumption, reduced device cost, reduced interference, and reduced device complexity.

Figure 11:
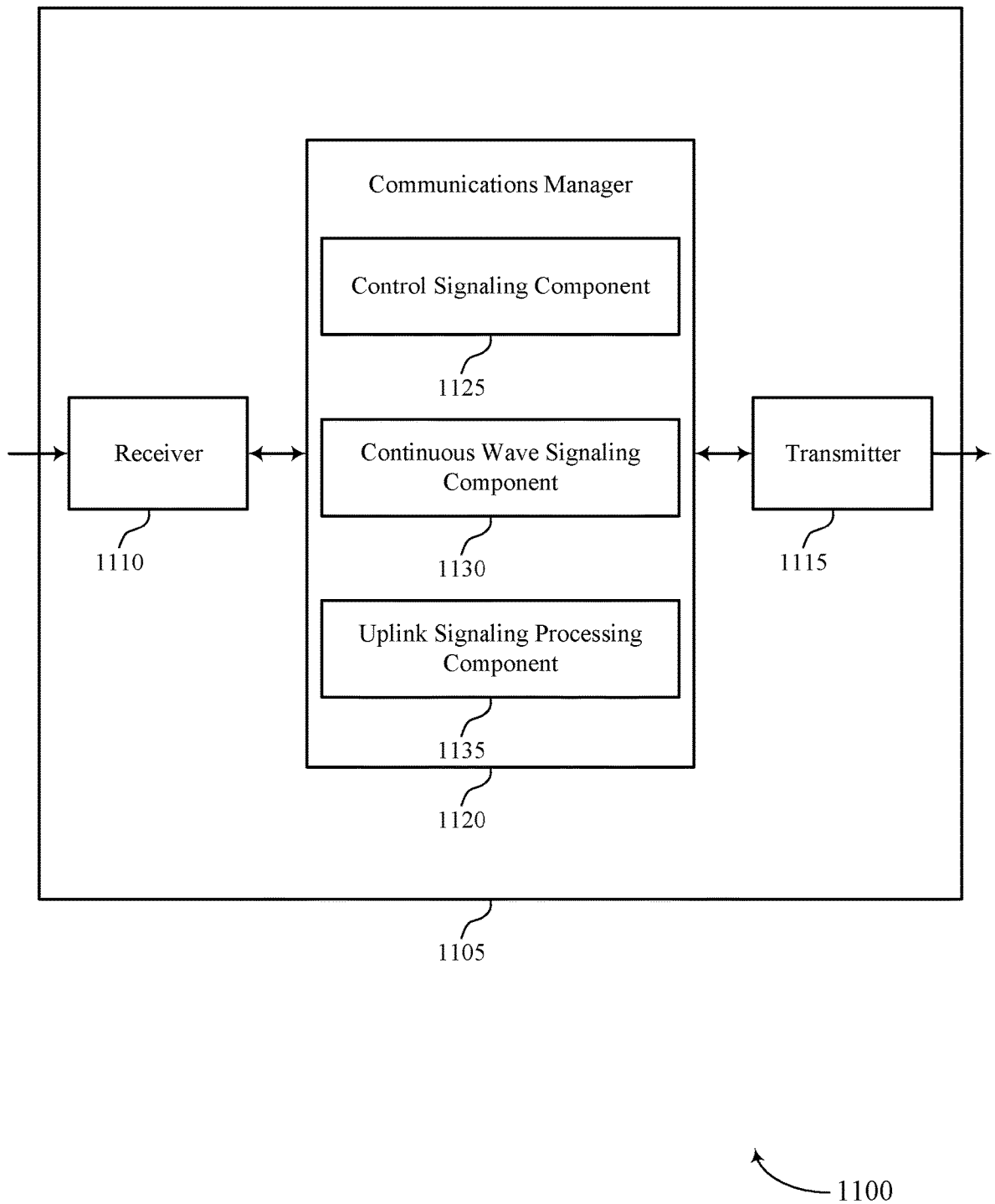

FIG. 11 shows a block diagram 1100 of a device 1105 that supports interference mitigation for envelope detection in ambient IoT communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of interference mitigation for envelope detection in ambient IoT communications as described herein. For example, the communications manager 1120 may include a control signaling component 1125, a continuous wave signaling component 1130, an uplink signaling processing component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a first wireless communication device in accordance with examples as disclosed herein. The control signaling component 1125 is capable of, configured to, or operable to support a means for transmitting, via a first radio frequency spectrum band, a control message including an uplink grant for a second wireless communication device to send, via a second radio frequency spectrum band, one or more backscattered uplink messages. The continuous wave signaling component 1130 is capable of, configured to, or operable to support a means for transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The continuous wave signaling component 1130 is capable of, configured to, or operable to support a means for transmitting the continuous waveform via the second radio frequency spectrum band. The uplink signaling processing component 1135 is capable of, configured to, or operable to support a means for receiving, via the second radio frequency spectrum band, a backscattered signal of the continuous waveform based on transmitting the continuous waveform, where the backscattered signal includes the one or more backscattered uplink messages.

Figure 12:
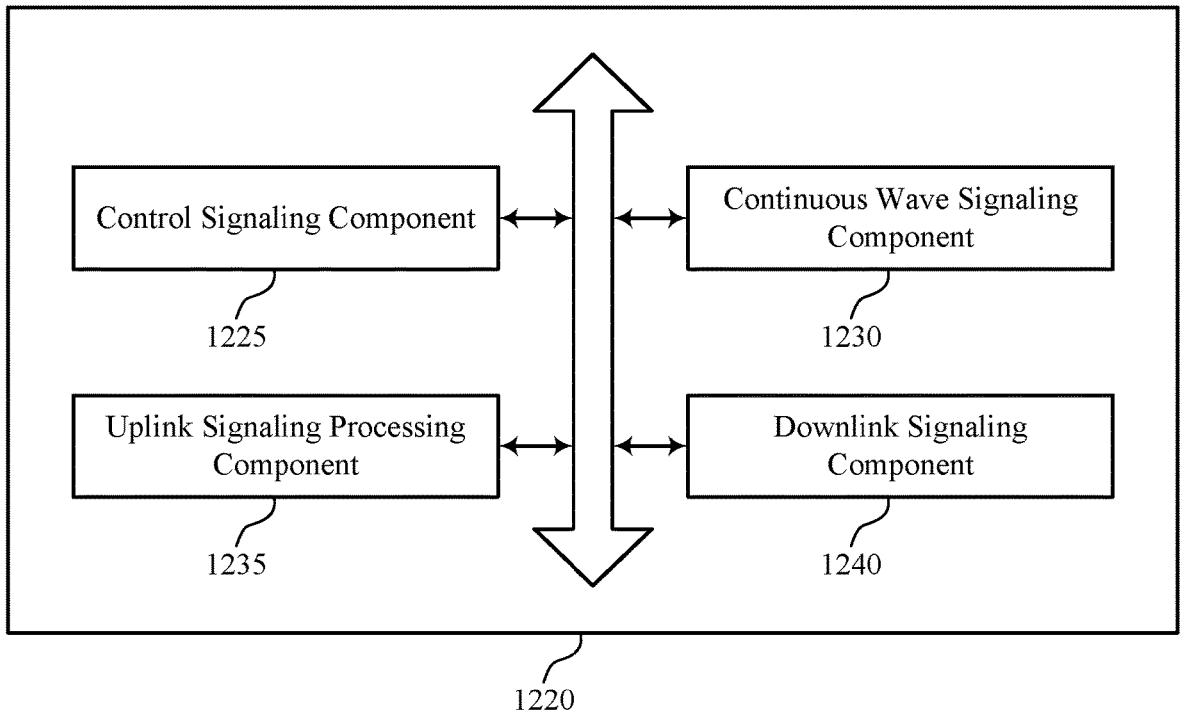
FIG. 12 shows a block diagram of a communications manager that supports interference mitigation for envelope detection in ambient IoT communications in accordance with one or more aspects of the present disclosure.

FIG. 12 shows a block diagram 1200 of a communications manager 1220 that supports interference mitigation for envelope detection in ambient IoT communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of interference mitigation for envelope detection in ambient IoT communications as described herein. For example, the communications manager 1220 may include a control signaling component 1225, a continuous wave signaling component 1230, an uplink signaling processing component 1235, a downlink signaling component 1240, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a first wireless communication device in accordance with examples as disclosed herein. The control signaling component 1225 is capable of, configured to, or operable to support a means for transmitting, via a first radio frequency spectrum band, a control message including an uplink grant for a second wireless communication device to send, via a second radio frequency spectrum band, one or more backscattered uplink messages. The continuous wave signaling component 1230 is capable of, configured to, or operable to support a means for transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. In some examples, the continuous wave signaling component 1230 is capable of, configured to, or operable to support a means for transmitting the continuous waveform via the second radio frequency spectrum band. The uplink signaling processing component 1235 is capable of, configured to, or operable to support a means for receiving, via the second radio frequency spectrum band, a backscattered signal of the continuous waveform based on transmitting the continuous waveform, where the backscattered signal includes the one or more backscattered uplink messages.

In some examples, the downlink signaling component 1240 is capable of, configured to, or operable to support a means for transmitting one or more downlink signals via the first radio frequency spectrum band, the one or more downlink signals including at least a set of co-source transmissions for the second wireless communication device and a third wireless communication device.

In some examples, the downlink signaling component 1240 is capable of, configured to, or operable to support a means for transmitting one or more downlink signals via the first radio frequency spectrum band, the one or more downlink signals including both a first set of downlink signals from the second wireless communication device transmitted with a second set of interfering downlink signals from a third wireless device.

In some examples, the continuous wave signaling component 1230 is capable of, configured to, or operable to support a means for transmitting, as part of a wireless power transfer procedure, wireless power transfer signaling to the second wireless communication device via the first radio frequency spectrum band, the second radio frequency spectrum band, or both.

In some examples, the uplink signaling processing component 1235 is capable of, configured to, or operable to support a means for receiving, concurrently with transmitting the wireless power transfer signaling via the first radio frequency spectrum band, the backscattered signal of the continuous waveform via the second radio frequency spectrum band.

In some examples, the control signaling component 1225 is capable of, configured to, or operable to support a means for transmitting, concurrently with transmitting the wireless power transfer signaling via the first radio frequency spectrum band, one or more downlink messages via the first radio frequency spectrum band.

In some examples, the threshold frequency gap includes a frequency gap of greater than 1 gigahertz (GHz).

In some examples, the first radio frequency spectrum band includes a first set of radio frequencies associated with narrow-band IoT communications and the second radio frequency spectrum band includes a second set of radio frequencies associated with industrial IoT communications.

In some examples, the first radio frequency spectrum band and the second radio frequency spectrum band include a set of one or more paired radio frequency spectrum bands associated with ambient IoT communications.

In some examples, the second radio frequency spectrum band is associated with higher traffic rates and higher user density relative to the first radio frequency spectrum band.

In some examples, the first wireless communication device includes an ambient IoT device, a reader device, a network entity, a UE, or any combination thereof.

In some examples, the second wireless communication device includes an ambient IoT device, a low-power tag device, a UE, or any combination thereof.

Figure 13:
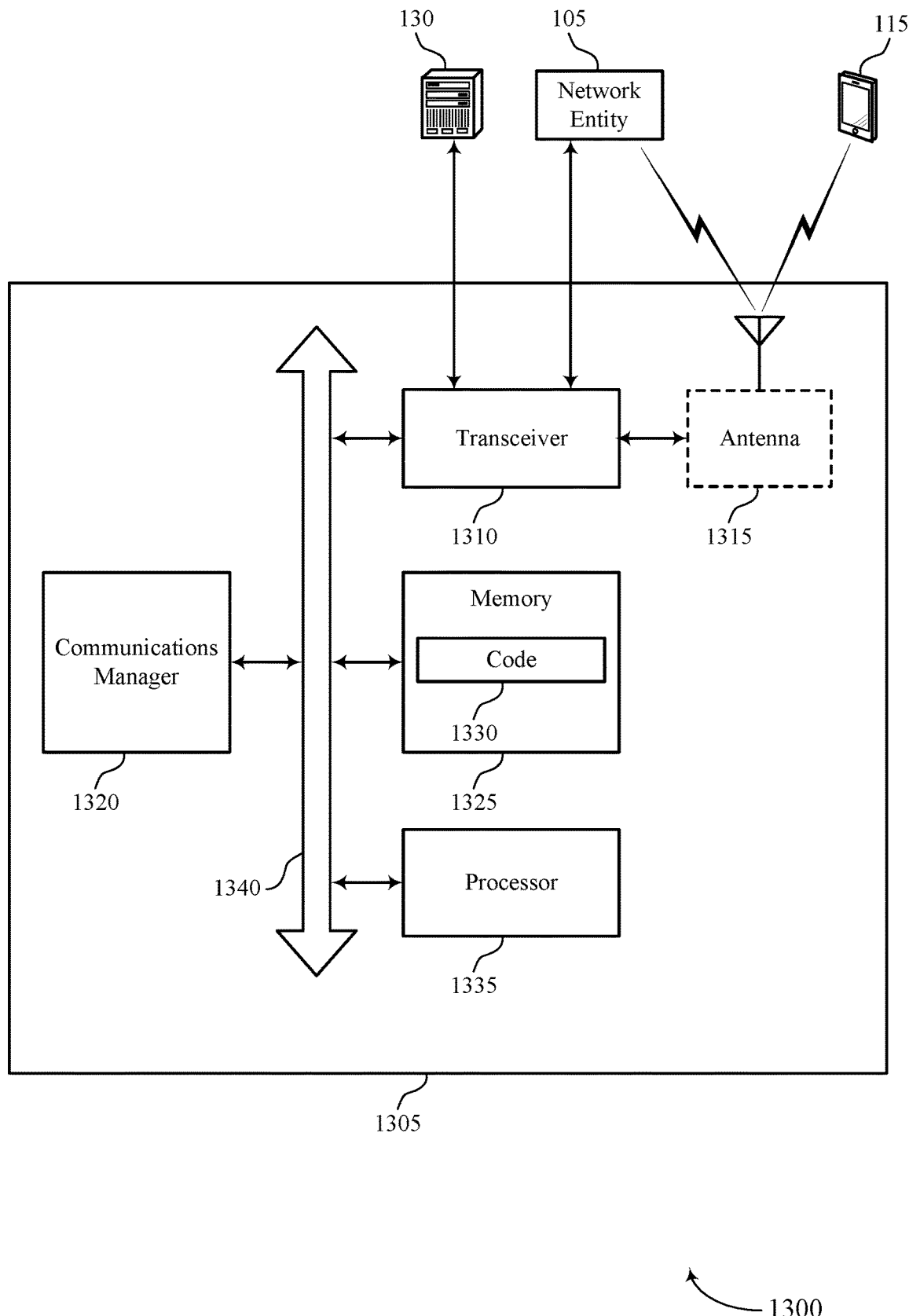
FIG. 13 shows a diagram of a system including a device that supports interference mitigation for envelope detection in ambient IoT communications in accordance with one or more aspects of the present disclosure.

FIG. 13 shows a diagram of a system 1300 including a device 1305 that supports interference mitigation for envelope detection in ambient IoT communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting interference mitigation for envelope detection in ambient IoT communications). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some implementations, the at least one processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the at least one processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a first wireless communication device in accordance with examples as disclosed herein. For example, the communications manager 1320 is capable of, configured to, or operable to support a means for transmitting, via a first radio frequency spectrum band, a control message including an uplink grant for a second wireless communication device to send, via a second radio frequency spectrum band, one or more backscattered uplink messages. The communications manager 1320 is capable of, configured to, or operable to support a means for transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The communications manager 1320 is capable of, configured to, or operable to support a means for transmitting the continuous waveform via the second radio frequency spectrum band. The communications manager 1320 is capable of, configured to, or operable to support a means for receiving, via the second radio frequency spectrum band, a backscattered signal of the continuous waveform based on transmitting the continuous waveform, where the backscattered signal includes the one or more backscattered uplink messages.

By including or configuring the communications manager 1320 in accordance with examples as described herein, the device 1305 may support techniques for reduced device processing, reduced power consumption, reduced device cost, reduced interference, and reduced device complexity improved communication reliability, reduced latency, more efficient utilization of communication resources and communication bands, longer battery life, improved utilization of processing capability, increased envelope detection efficiency, and increased signal filtering efficiency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of interference mitigation for envelope detection in ambient IoT communications as described herein, or the at least one processor 1335 and the at least one memory 1325 may be otherwise configured to, individually or collectively, perform or support such operations.

Figure 14:
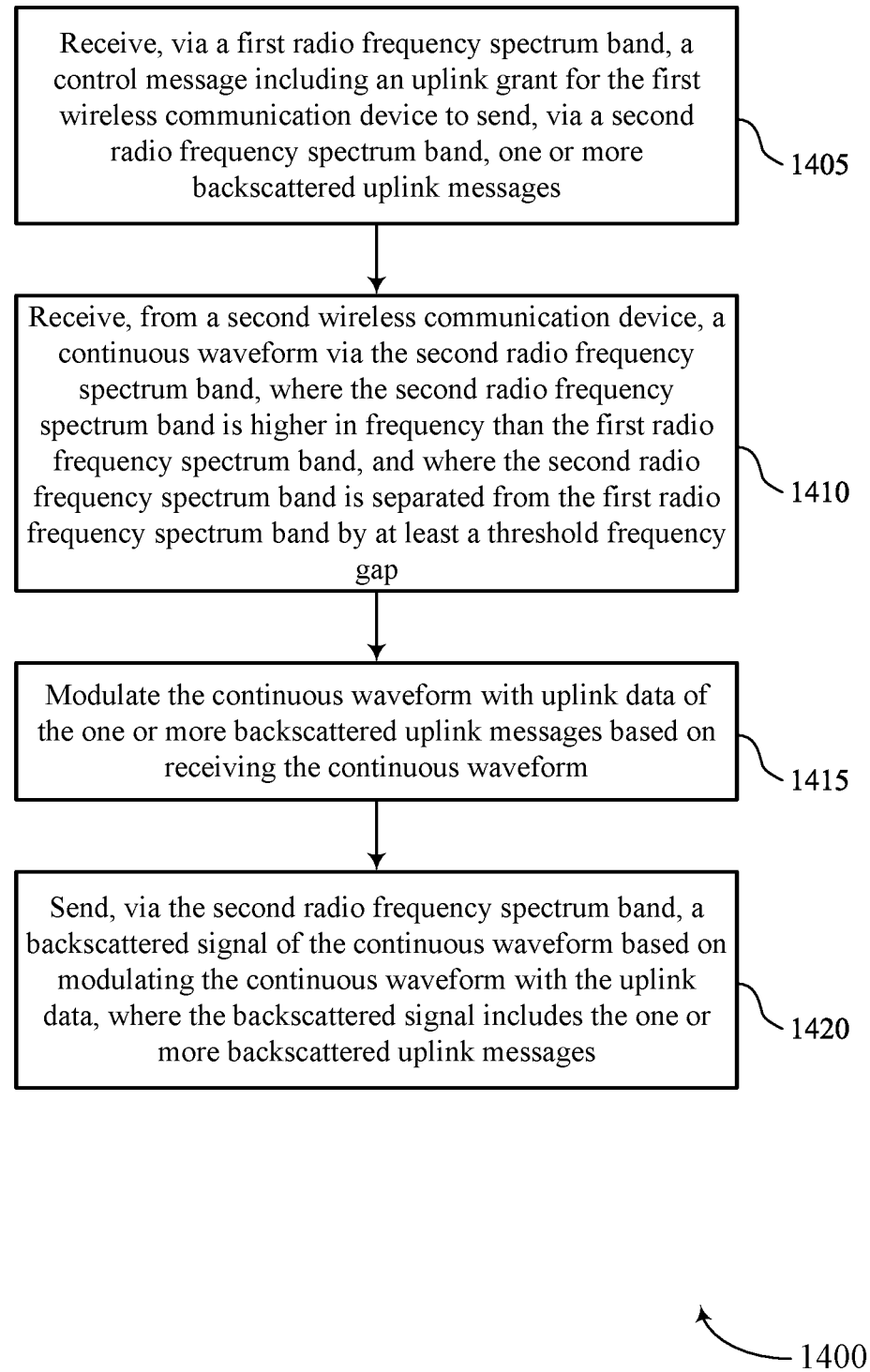
FIGS. 14 through 16 show flowcharts illustrating methods that support interference mitigation for envelope detection in ambient IoT communications in accordance with one or more aspects of the present disclosure.

FIG. 14 shows a flowchart illustrating a method 1400 that supports interference mitigation for envelope detection in ambient IoT communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, via a first radio frequency spectrum band, a control message including an uplink grant for the first wireless communication device to send, via a second radio frequency spectrum band, one or more backscattered uplink messages. The operations of block 1405 may be performed in accordance with examples as disclosed herein. In some examples, aspects of the operations of 1405 may be performed by a control signaling component 825 as described with reference to FIG. 8.

At 1410, the method may include receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The operations of block 1410 may be performed in accordance with examples as disclosed herein. In some examples, aspects of the operations of 1410 may be performed by a continuous waveform processing component 830 as described with reference to FIG. 8.

At 1415, the method may include modulating the continuous waveform with uplink data of the one or more backscattered uplink messages based on receiving the continuous waveform. The operations of block 1415 may be performed in accordance with examples as disclosed herein. In some examples, aspects of the operations of 1415 may be performed by a data modulation component 835 as described with reference to FIG. 8.

At 1420, the method may include sending, via the second radio frequency spectrum band, a backscattered signal of the continuous waveform based on modulating the continuous waveform with the uplink data, where the backscattered signal includes the one or more backscattered uplink messages. The operations of block 1420 may be performed in accordance with examples as disclosed herein. In some examples, aspects of the operations of 1420 may be performed by a backscattering component 840 as described with reference to FIG. 8.

Figure 15:
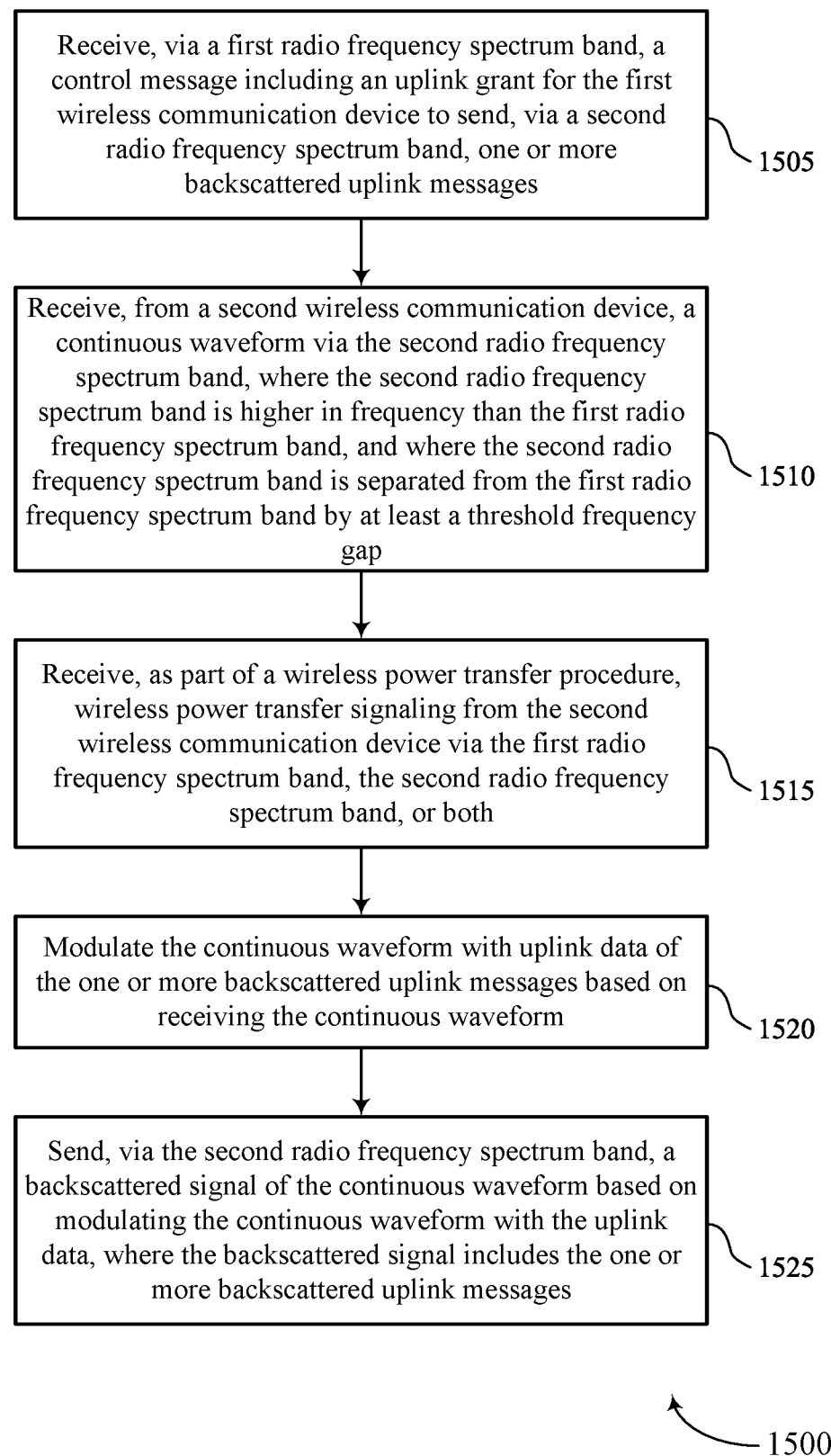

FIG. 15 shows a flowchart illustrating a method 1500 that supports interference mitigation for envelope detection in ambient IoT communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, via a first radio frequency spectrum band, a control message including an uplink grant for the first wireless communication device to send, via a second radio frequency spectrum band, one or more backscattered uplink messages. The operations of block 1505 may be performed in accordance with examples as disclosed herein. In some examples, aspects of the operations of 1505 may be performed by a control signaling component 825 as described with reference to FIG. 8.

At 1510, the method may include receiving, from a second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The operations of block 1510 may be performed in accordance with examples as disclosed herein. In some examples, aspects of the operations of 1510 may be performed by a continuous waveform processing component 830 as described with reference to FIG. 8.

At 1515, the method may include receiving, as part of a wireless power transfer procedure, wireless power transfer signaling from the second wireless communication device via the first radio frequency spectrum band, the second radio frequency spectrum band, or both. The operations of block 1515 may be performed in accordance with examples as disclosed herein. In some examples, aspects of the operations of 1515 may be performed by a continuous waveform processing component 830 as described with reference to FIG. 8.

At 1520, the method may include modulating the continuous waveform with uplink data of the one or more backscattered uplink messages based on receiving the continuous waveform. The operations of block 1520 may be performed in accordance with examples as disclosed herein. In some examples, aspects of the operations of 1520 may be performed by a data modulation component 835 as described with reference to FIG. 8.

At 1525, the method may include sending, via the second radio frequency spectrum band, a backscattered signal of the continuous waveform based on modulating the continuous waveform with the uplink data, where the backscattered signal includes the one or more backscattered uplink messages. The operations of block 1525 may be performed in accordance with examples as disclosed herein. In some examples, aspects of the operations of 1525 may be performed by a backscattering component 840 as described with reference to FIG. 8.

Figure 16:
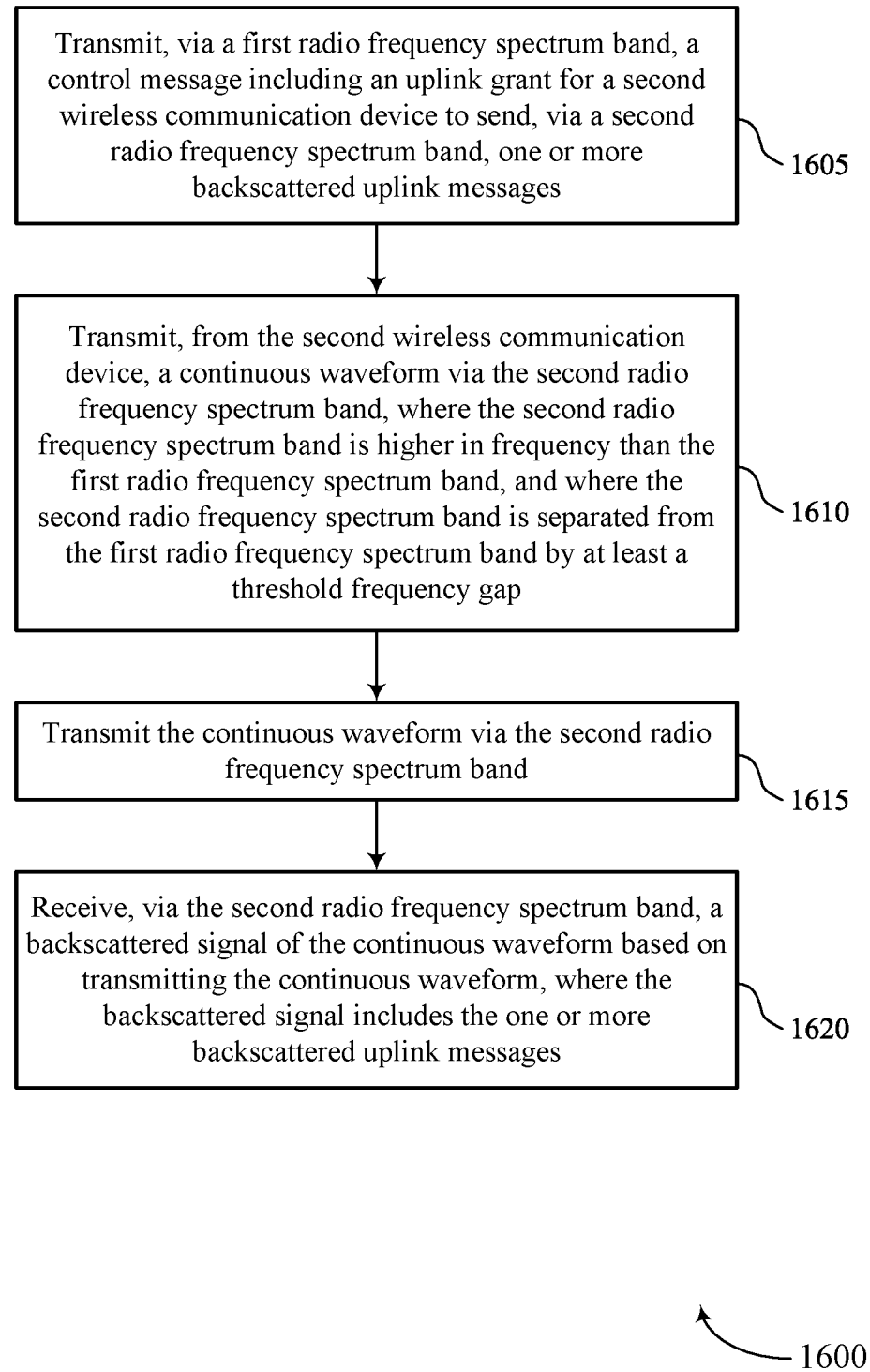

FIG. 16 shows a flowchart illustrating a method 1600 that supports interference mitigation for envelope detection in ambient IoT communications in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, via a first radio frequency spectrum band, a control message including an uplink grant for a second wireless communication device to send, via a second radio frequency spectrum band, one or more backscattered uplink messages. The operations of block 1605 may be performed in accordance with examples as disclosed herein. In some examples, aspects of the operations of 1605 may be performed by a control signaling component 1225 as described with reference to FIG. 12.

At 1610, the method may include transmitting, from the second wireless communication device, a continuous waveform via the second radio frequency spectrum band, where the second radio frequency spectrum band is higher in frequency than the first radio frequency spectrum band, and where the second radio frequency spectrum band is separated from the first radio frequency spectrum band by at least a threshold frequency gap. The operations of block 1610 may be performed in accordance with examples as disclosed herein. In some examples, aspects of the operations of 1610 may be performed by a continuous wave signaling component 1230 as described with reference to FIG. 12.

At 1615, the method may include transmitting the continuous waveform via the second radio frequency spectrum band. The operations of block 1615 may be performed in accordance with examples as disclosed herein. In some examples, aspects of the operations of 1615 may be performed by a continuous wave signaling component 1230 as described with reference to FIG. 12.

At 1620, the method may include receiving, via the second radio frequency spectrum band, a backscattered signal of the continuous waveform based on transmitting the continuous waveform, where the backscattered signal includes the one or more backscattered uplink messages. The operations of block 1620 may be performed in accordance with examples as disclosed herein. In some examples, aspects of the operations of 1620 may be performed by an uplink signaling processing component 1235 as described with reference to FIG. 12.

The following provides an overview of aspects of the present disclosure:

Aspect 1: A method for wireless communications at a first wireless communication device, comprising: receiving, via a first radio frequency spectrum band, a control message comprising an uplink grant for the first wireless communication device to send, via a second radio frequency spectrum band, one or more backscattered uplink messages; receiving, from a second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap; modulating the continuous waveform with uplink data of the one or more backscattered uplink messages based at least in part on receiving the continuous waveform; and sending, via the second radio frequency spectrum band, a backscattered signal of the continuous waveform based at least in part on modulating the continuous waveform with the uplink data, wherein the backscattered signal comprises the one or more backscattered uplink messages.

Aspect 2: The method of aspect 1, further comprising: receiving one or more downlink signals via the first radio frequency spectrum band, the one or more downlink signals comprising at least a set of co-source transmissions; and performing one or more passive bandpass filtering operations to filter the set of co-source transmissions from the one or more downlink signals.

Aspect 3: The method of aspect 2, further comprising: performing an envelope detection operation on the one or more downlink signals after performing the one or more passive bandpass filtering operations to filter the set of co-source transmissions from the one or more downlink signals.

Aspect 4: The method of any of aspects 1 through 3, further comprising: receiving one or more downlink signals via the first radio frequency spectrum band, the one or more downlink signals comprising both a first set of downlink signals from the second wireless communication device and a second set of interfering downlink signals from a third wireless device; and performing a dual-tone decoding operation to separate the first set of downlink signals from the second set of interfering downlink signals.

Aspect 5: The method of aspect 4, further comprising: performing an envelope detection operation on the one or more downlink signals after performing the dual-tone decoding operation to separate the first set of downlink signals from the second set of interfering downlink signals.

Aspect 6: The method of any of aspects 1 through 5, further comprising: receiving, as part of a wireless power transfer procedure, wireless power transfer signaling from the second wireless communication device via the first radio frequency spectrum band, the second radio frequency spectrum band, or both.

Aspect 7: The method of aspect 6, further comprising: sending, concurrently with receiving the wireless power transfer signaling via the first radio frequency spectrum band, the backscattered signal of the continuous waveform via the second radio frequency spectrum band.

Aspect 8: The method of any of aspects 6 through 7, further comprising: receiving, concurrently with receiving the wireless power transfer signaling via the first radio frequency spectrum band, one or more downlink messages via the first radio frequency spectrum band.

Aspect 9: The method of any of aspects 1 through 8, wherein the threshold frequency gap comprises a frequency gap greater than 1 GHz.

Aspect 10: The method of any of aspects 1 through 9, wherein the first radio frequency spectrum band comprises a first set of radio frequencies associated with narrow-band IoT communications and the second radio frequency spectrum band comprises a second set of radio frequencies associated with industrial IoT communications.

Aspect 11: The method of any of aspects 1 through 10, wherein the first radio frequency spectrum band and the second radio frequency spectrum band comprise a set of one or more paired radio frequency spectrum bands associated with ambient IoT communications.

Aspect 12: The method of any of aspects 1 through 11, wherein the second radio frequency spectrum band is associated with higher traffic rates and higher user density relative to the first radio frequency spectrum band.

Aspect 13: The method of any of aspects 1 through 12, wherein the first wireless communication device comprises an ambient IoT device, a low-power tag device, a UE, or any combination thereof.

Aspect 14: The method of any of aspects 1 through 13, wherein the second wireless communication device comprises an ambient IoT device, a reader device, a network entity, a UE, or any combination thereof.

Aspect 15: A method for wireless communications at a first wireless communication device, comprising: transmitting, via a first radio frequency spectrum band, a control message comprising an uplink grant for a second wireless communication device to send, via a second radio frequency spectrum band, one or more backscattered uplink messages; transmitting, from the second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap; transmitting the continuous waveform via the second radio frequency spectrum band; and receiving, via the second radio frequency spectrum band, a backscattered signal of the continuous waveform based at least in part on transmitting the continuous waveform, wherein the backscattered signal comprises the one or more backscattered uplink messages.

Aspect 16: The method of aspect 15, further comprising: transmitting one or more downlink signals via the first radio frequency spectrum band, the one or more downlink signals comprising at least a set of co-source transmissions for the second wireless communication device and a third wireless communication device.

Aspect 17: The method of any of aspects 15 through 16, further comprising: transmitting one or more downlink signals via the first radio frequency spectrum band, the one or more downlink signals comprising both a first set of downlink signals from the second wireless communication device transmitted with a second set of interfering downlink signals from a third wireless device.

Aspect 18: The method of any of aspects 15 through 17, further comprising: transmitting, as part of a wireless power transfer procedure, wireless power transfer signaling to the second wireless communication device via the first radio frequency spectrum band, the second radio frequency spectrum band, or both.

Aspect 19: The method of aspect 18, further comprising: receiving, concurrently with transmitting the wireless power transfer signaling via the first radio frequency spectrum band, the backscattered signal of the continuous waveform via the second radio frequency spectrum band.

Aspect 20: The method of any of aspects 18 through 19, further comprising: transmitting, concurrently with transmitting the wireless power transfer signaling via the first radio frequency spectrum band, one or more downlink messages via the first radio frequency spectrum band.

Aspect 21: The method of any of aspects 15 through 20, wherein the threshold frequency gap comprises a frequency gap of greater than 1 GHz.

Aspect 22: The method of any of aspects 15 through 21, wherein the first radio frequency spectrum band comprises a first set of radio frequencies associated with narrow-band IoT communications and the second radio frequency spectrum band comprises a second set of radio frequencies associated with industrial IoT communications.

Aspect 23: The method of any of aspects 15 through 22, wherein the first radio frequency spectrum band and the second radio frequency spectrum band comprise a set of one or more paired radio frequency spectrum bands associated with ambient IoT communications.

Aspect 24: The method of any of aspects 15 through 23, wherein the second radio frequency spectrum band is associated with higher traffic rates and higher user density relative to the first radio frequency spectrum band.

Aspect 25: The method of any of aspects 15 through 24, wherein the first wireless communication device comprises an ambient IoT device, a reader device, a network entity, a UE, or any combination thereof.

Aspect 26: The method of any of aspects 15 through 25, wherein the second wireless communication device comprises an ambient IoT device, a low-power tag device, a UE, or any combination thereof.

Aspect 27: An apparatus for wireless communications at a first wireless communication device, comprising at least one processor; at least one memory coupled with the at least one processor; and instructions stored in the at least one memory and executable by the at least one processor to cause the apparatus to perform a method of any of aspects 1 through 14.

Aspect 28: An apparatus for wireless communications at a first wireless communication device, comprising at least one means for performing a method of any of aspects 1 through 14.

Aspect 29: A non-transitory computer-readable medium storing code for wireless communications at a first wireless communication device, the code comprising instructions executable by a processor to perform a method of any of aspects 1 through 14.

Aspect 30: An apparatus for wireless communications at a first wireless communication device, comprising at least one processor; at least one memory coupled with the at least one processor; and instructions stored in the at least one memory and executable by the at least one processor to cause the apparatus to perform a method of any of aspects 15 through 26.

Aspect 31: An apparatus for wireless communications at a first wireless communication device, comprising at least one means for performing a method of any of aspects 15 through 26.

Aspect 32: A non-transitory computer-readable medium storing code for wireless communications at a first wireless communication device, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless communication device, comprising:

at least one processor;
at least one memory coupled with the at least one processor; and
instructions stored in the at least one memory and executable by the at least one processor to cause the apparatus to:
receive, via a first radio frequency spectrum band, a control message comprising an uplink grant for the first wireless communication device to send, via a second radio frequency spectrum band, one or more backscattered uplink messages;
receive, from a second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap;
modulate the continuous waveform with uplink data of the one or more backscattered uplink messages based at least in part on receiving the continuous waveform; and
send, via the second radio frequency spectrum band, a backscattered signal of the continuous waveform based at least in part on modulating the continuous waveform with the uplink data, wherein the backscattered signal comprises the one or more backscattered uplink messages.

2. The apparatus of claim 1, wherein the instructions are further executable by the at least one processor to cause the apparatus to:
receive one or more downlink signals via the first radio frequency spectrum band, the one or more downlink signals comprising at least a set of co-source transmissions; and
perform one or more passive bandpass filtering operations to filter the set of co-source transmissions from the one or more downlink signals.

3. The apparatus of claim 2, wherein the instructions are further executable by the at least one processor to cause the apparatus to:
perform an envelope detection operation on the one or more downlink signals after performing the one or more passive bandpass filtering operations to filter the set of co-source transmissions from the one or more downlink signals.

4. The apparatus of claim 1, wherein the instructions are further executable by the at least one processor to cause the apparatus to:
receive one or more downlink signals via the first radio frequency spectrum band, the one or more downlink signals comprising both a first set of downlink signals from the second wireless communication device and a second set of interfering downlink signals from a third wireless device; and
perform a dual-tone decoding operation to separate the first set of downlink signals from the second set of interfering downlink signals.

5. The apparatus of claim 4, wherein the instructions are further executable by the at least one processor to cause the apparatus to:
perform an envelope detection operation on the one or more downlink signals after performing the dual-tone decoding operation to separate the first set of downlink signals from the second set of interfering downlink signals.

6. The apparatus of claim 1, wherein the instructions are further executable by the at least one processor to cause the apparatus to:
receive, as part of a wireless power transfer procedure, wireless power transfer signaling from the second wireless communication device via the first radio frequency spectrum band, the second radio frequency spectrum band, or both.

7. The apparatus of claim 6, wherein the instructions are further executable by the at least one processor to cause the apparatus to:
send, concurrently with receiving the wireless power transfer signaling via the first radio frequency spectrum band, the backscattered signal of the continuous waveform via the second radio frequency spectrum band.

8. The apparatus of claim 6, wherein the instructions are further executable by the at least one processor to cause the apparatus to:
receive, concurrently with receiving the wireless power transfer signaling via the first radio frequency spectrum band, one or more downlink messages via the first radio frequency spectrum band.

9. The apparatus of claim 1, wherein the threshold frequency gap comprises a frequency gap greater than 1 gigahertz (GHz).

10. The apparatus of claim 1, wherein the first radio frequency spectrum band comprises a first set of radio frequencies associated with narrow-band IoT communications and the second radio frequency spectrum band comprises a second set of radio frequencies associated with industrial IoT communications.

11. The apparatus of claim 1, wherein the first radio frequency spectrum band and the second radio frequency spectrum band comprise a set of one or more paired radio frequency spectrum bands associated with ambient IoT communications.

12. The apparatus of claim 1, wherein the second radio frequency spectrum band is associated with higher traffic rates and higher user density relative to the first radio frequency spectrum band.

13. The apparatus of claim 1, wherein the first wireless communication device comprises an ambient IoT device, a low-power tag device, a user equipment (UE), or any combination thereof.

14. The apparatus of claim 1, wherein the second wireless communication device comprises an ambient IoT device, a reader device, a network entity, a user equipment (UE), or any combination thereof.

15. An apparatus for wireless communications at a first wireless communication device, comprising:
at least one processor;
at least one memory coupled with the at least one processor; and
instructions stored in the at least one memory and executable by the at least one processor to cause the apparatus to:
transmit, via a first radio frequency spectrum band, a control message comprising an uplink grant for a second wireless communication device to send, via a second radio frequency spectrum band, one or more backscattered uplink messages;
transmit, from the second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap;
transmit the continuous waveform via the second radio frequency spectrum band; and
receive, via the second radio frequency spectrum band, a backscattered signal of the continuous waveform based at least in part on transmitting the continuous waveform, wherein the backscattered signal comprises the one or more backscattered uplink messages.

16. The apparatus of claim 15, wherein the instructions are further executable by the at least one processor to cause the apparatus to:
transmit one or more downlink signals via the first radio frequency spectrum band, the one or more downlink signals comprising at least a set of co-source transmissions for the second wireless communication device and a third wireless communication device.

17. The apparatus of claim 15, wherein the instructions are further executable by the at least one processor to cause the apparatus to:
transmit one or more downlink signals via the first radio frequency spectrum band, the one or more downlink signals comprising both a first set of downlink signals from the second wireless communication device transmitted with a second set of interfering downlink signals from a third wireless device.

18. The apparatus of claim 15, wherein the instructions are further executable by the at least one processor to cause the apparatus to:
transmit, as part of a wireless power transfer procedure, wireless power transfer signaling to the second wireless communication device via the first radio frequency spectrum band, the second radio frequency spectrum band, or both.

19. The apparatus of claim 18, wherein the instructions are further executable by the at least one processor to cause the apparatus to:
receive, concurrently with transmitting the wireless power transfer signaling via the first radio frequency spectrum band, the backscattered signal of the continuous waveform via the second radio frequency spectrum band.

20. The apparatus of claim 18, wherein the instructions are further executable by the at least one processor to cause the apparatus to:
transmit, concurrently with transmitting the wireless power transfer signaling via the first radio frequency spectrum band, one or more downlink messages via the first radio frequency spectrum band.

21. The apparatus of claim 15, wherein the threshold frequency gap comprises a frequency gap of greater than 1 gigahertz (GHz).

22. The apparatus of claim 15, wherein the first radio frequency spectrum band comprises a first set of radio frequencies associated with narrow-band IoT communications and the second radio frequency spectrum band comprises a second set of radio frequencies associated with industrial IoT communications.

23. The apparatus of claim 15, wherein the first radio frequency spectrum band and the second radio frequency spectrum band comprise a set of one or more paired radio frequency spectrum bands associated with ambient IoT communications.

24. The apparatus of claim 15, wherein the second radio frequency spectrum band is associated with higher traffic rates and higher user density relative to the first radio frequency spectrum band.

25. The apparatus of claim 15, wherein the first wireless communication device comprises an ambient IoT device, a reader device, a network entity, a user equipment (UE), or any combination thereof.

26. The apparatus of claim 15, wherein the second wireless communication device comprises an ambient IoT device, a low-power tag device, a user equipment (UE), or any combination thereof.

27. A method for wireless communications at a first wireless communication device, comprising:
  receiving, via a first radio frequency spectrum band, a control message comprising an uplink grant for the first wireless communication device to send, via a second radio frequency spectrum band, one or more backscattered uplink messages;
  receiving, from a second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap;
  modulating the continuous waveform with uplink data of the one or more backscattered uplink messages based at least in part on receiving the continuous waveform; and
  sending, via the second radio frequency spectrum band, a backscattered signal of the continuous waveform based at least in part on modulating the continuous waveform with the uplink data, wherein the backscattered signal comprises the one or more backscattered uplink messages.

28. The method of claim 27, further comprising:
  receiving one or more downlink signals via the first radio frequency spectrum band, the one or more downlink signals comprising at least a set of co-source transmissions; and
  performing one or more passive bandpass filtering operations to filter the set of co-source transmissions from the one or more downlink signals.

29. The method of claim 28, further comprising:
  performing an envelope detection operation on the one or more downlink signals after performing the one or more passive bandpass filtering operations to filter the set of co-source transmissions from the one or more downlink signals.

30. A method for wireless communications at a first wireless communication device, comprising:
  transmitting, via a first radio frequency spectrum band, a control message comprising an uplink grant for a second wireless communication device to send, via a second radio frequency spectrum band, one or more backscattered uplink messages;
  transmitting, from the second wireless communication device, a continuous waveform via the second radio frequency spectrum band, wherein the second radio frequency spectrum band is higher in frequency than the first radio frequency spectrum band, and wherein the second radio frequency spectrum band is separated from the first radio frequency spectrum band by at least a threshold frequency gap;
  transmitting the continuous waveform via the second radio frequency spectrum band; and
  receiving, via the second radio frequency spectrum band, a backscattered signal of the continuous waveform based at least in part on transmitting the continuous waveform, wherein the backscattered signal comprises the one or more backscattered uplink messages.

* * * * *